United States Patent
Soin et al.

(10) Patent No.: US 7,716,273 B2
(45) Date of Patent: May 11, 2010

(54) SYSTEMS AND METHODS FOR PROJECTING CONTENT FROM COMPUTING DEVICES

(75) Inventors: Ravipal S. Soin, Kirkland, WA (US);
Andrew J. Fuller, Redmond, WA (US);
Todd R. Manion, Seattle, WA (US);
Ronald O. Zink, Neiully (FR)

(73) Assignee: Microsoft Corporation, Redmond, WA (US)

( * ) Notice: Subject to any disclaimer, the term of this patent is extended or adjusted under 35 U.S.C. 154(b) by 1164 days.

(21) Appl. No.: 10/786,313

(22) Filed: Feb. 25, 2004

(65) Prior Publication Data

US 2005/0091302 A1     Apr. 28, 2005

Related U.S. Application Data

(60) Provisional application No. 60/514,338, filed on Oct. 24, 2003.

(51) Int. Cl.
*G06F 15/16*     (2006.01)
(52) U.S. Cl. .................................................... 709/203
(58) Field of Classification Search ................ 709/200, 709/202, 203, 230; 345/1.1, 1.2, 2.1, 2.3; 715/730, 733
See application file for complete search history.

(56) References Cited

U.S. PATENT DOCUMENTS

| | | | |
|---|---|---|---|
| 5,835,715 A | 11/1998 | Dahl | |
| 5,944,794 A | 8/1999 | Okamoto et al. | |
| 5,987,376 A | 11/1999 | Olson et al. | |
| 6,088,451 A | 7/2000 | He et al. | |
| 6,349,337 B1 * | 2/2002 | Parsons et al. | 709/227 |
| 6,470,375 B1 | 10/2002 | Whitner et al. | |
| 6,760,749 B1 * | 7/2004 | Dunlap et al. | 709/204 |
| 6,823,327 B1 | 11/2004 | Klug et al. | |
| 6,904,451 B1 * | 6/2005 | Orfitelli et al. | 709/203 |
| 6,917,964 B2 | 7/2005 | Kita et al. | |
| 6,943,752 B2 * | 9/2005 | Masumoto et al. | 345/1.1 |
| 6,981,043 B2 | 12/2005 | Botz et al. | |
| 7,027,035 B2 * | 4/2006 | Youden | 345/169 |
| 2002/0029256 A1 | 3/2002 | Zintel et al. | |
| 2002/0059415 A1 * | 5/2002 | Chang et al. | 709/223 |

(Continued)

FOREIGN PATENT DOCUMENTS

WO    WO/1995/003664    2/1995

(Continued)

OTHER PUBLICATIONS

"Transitions or transmissions?" *AV Magazine*, 2001, 11, 46.

(Continued)

*Primary Examiner*—Asad M Nawaz
*Assistant Examiner*—Jason Recek
(74) *Attorney, Agent, or Firm*—Woodcock Washburn LLP

(57) ABSTRACT

Systems and methods are provided that enable an alternate display device to wirelessly receive content from a computing device, freeing users from the burden of physically connecting the computing device via a cable. The content sent to the display device can also be simultaneously or separately viewed on the computing devices of other nearby computing devices. Generic mechanism(s) and corresponding user interfaces are provided for computing devices to engage in discovery of devices to which content may be delivered, for accepting delivery and for initiating transmission of content.

30 Claims, 15 Drawing Sheets

U.S. PATENT DOCUMENTS

| | | | |
|---|---|---|---|
| 2002/0108108 A1 | 8/2002 | Akaiwa et al. | |
| 2002/0112058 A1 | 8/2002 | Weisman et al. | |
| 2002/0143989 A1 | 10/2002 | Huitema et al. | |
| 2002/0147791 A1 | 10/2002 | Choi | |
| 2002/0188657 A1 | 12/2002 | Traversat et al. | |
| 2002/0196378 A1 | 12/2002 | Slobodin | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088681 A1 | 5/2003 | Liscano et al. | |
| 2003/0096576 A1* | 5/2003 | Salonidis et al. | 455/41 |
| 2003/0098819 A1 | 5/2003 | Sukthankar et al. | |
| 2003/0110217 A1* | 6/2003 | Raju | 709/204 |
| 2003/0117532 A1 | 6/2003 | Karasawa et al. | |
| 2003/0117587 A1 | 6/2003 | Olson et al. | |
| 2003/0191836 A1 | 10/2003 | Murtha et al. | |
| 2003/0196060 A1 | 10/2003 | Miller | |
| 2003/0236889 A1 | 12/2003 | Manion et al. | |
| 2004/0003250 A1* | 1/2004 | Kindberg et al. | 713/171 |
| 2004/0064693 A1 | 4/2004 | Pabla et al. | |
| 2004/0111469 A1 | 6/2004 | Manion et al. | |
| 2004/0111515 A1 | 6/2004 | Manion et al. | |
| 2004/0128344 A1 | 7/2004 | Trossen | |
| 2004/0133640 A1 | 7/2004 | Yeager et al. | |
| 2004/0148333 A1 | 7/2004 | Manion et al. | |
| 2004/0148611 A1 | 7/2004 | Manion et al. | |
| 2004/0192349 A1* | 9/2004 | Reilly | 455/456.2 |
| 2004/0205243 A1 | 10/2004 | Hurvig et al. | |
| 2004/0217948 A1* | 11/2004 | Kawasaki et al. | 345/204 |
| 2005/0036509 A1* | 2/2005 | Acharya et al. | 370/466 |
| 2005/0086300 A1 | 4/2005 | Yeager et al. | |
| 2005/0088980 A1* | 4/2005 | Olkkonen et al. | 370/255 |
| 2005/0091359 A1 | 4/2005 | Soin | |
| 2005/0102356 A1 | 5/2005 | Manion | |

FOREIGN PATENT DOCUMENTS

| | | |
|---|---|---|
| WO | WO/2004/043891 | 7/2000 |
| WO | WO/2003/058476 | 7/2003 |

OTHER PUBLICATIONS

Bove, V.M., Jr. et al., "Personal Projectors Based on VCSEL Arrays," *Proceedings of the SPIE —The International Society for Optical Engineering*, Santa Clara, CA, Jan. 22-23, 2003, 5002, 1-6.

Chiu, P. et al., "Meeting Capture in a Media Enriched Conference Room," *Cooperative Buildings: Integrating Information, Organizations and Architecture; Second International Workshop, CoBuild '99; Proceedings*, Pittsburgh, Pennsylvania, Oct. 1-2, 1999, 79-88.

Chiu, P. et al., "NoteLook: Taking Notes in Meetings with Digital Video and Ink," *Proceedings ACM Multimedia*, Orlando, Florida, Oct. 30-Nov. 5, 1999, 149-158.

Fordham, E., "Tele-Presentations," *Business Equipment Digest*, 1994, 41-42 and 44.

Jones, C. et al., "Group Interactive Learning with Group Process Support Technology," *British J. Educational Technology*, 2001, 32(5), 571-586.

Miyamoto, M. et al., "Multicast Protocol for Presentation in Wireless LAN Environment," *Trans. of the Information Processing Society of Japan*, 2001, 42(12), 3093-3101 (English language abstract included).

Takao, N. et al., "Tele-Graffiti: A Camera-Projector Based Remote Sketching System with Hand-Based User Interface and Automatic Session Summarization," *Int'l J. Computer Vision*, 2003, 53(2), 115-133.

Vila, X. et al., "A PDA-Based Interface for a Computer Supported Educational System," *Proceedings 3rd IEEE International Conference on Advanced Technologies*, Athens, Greece, Jul. 9-11, 2003, 12-16.

Zhang, J. et al., "Software Solution to Completely Wireless Presentation," *Proceedings International Conference on Parallel Processing Workshops*, Valencia, Spain, Sep. 3-7, 2001, 459-464 (Abstract only).

In the United States Patent and Trademark Office, in Re. U.S. Appl. No. 10/786,833 filed Feb. 25, 2004: Non-final rejection dated Mar. 16, 2009.

In the United States Patent and Trademark Office, in Re. U.S. Appl. No. 10/179,431 filed Jun. 25, 2002: Non-final rejection dated Jul. 26, 2005.

In the United States Patent and Trademark Office, in Re. U.S. Appl. No. 10/179,431 filed Jun. 25, 2002: Final rejection dated Feb. 9, 2006.

In the United States Patent and Trademark Office, in Re. U.S. Appl. No. 10/179,431 filed Jun. 25, 2002: Non-final rejection dated May 9, 2006.

In the United States Patent and Trademark Office, in Re. U.S. Appl. No. 10/179,431 filed Jun. 25, 2002: Final rejection dated Nov. 1, 2006.

In the United States Patent and Trademark Office, in Re. U.S. Appl. No. 10/179,431 filed Jun. 25, 2002: Non-final rejection dated Jun. 14, 2007.

In the United States Patent and Trademark Office, in Re. U.S. Appl. No. 10/179,431 filed Jun. 25, 2002: Final rejection dated Nov. 23, 2007.

In the United States Patent and Trademark Office, in Re. U.S. Appl. No. 10/692,384 filed Oct. 23, 2003: Non-final rejection dated Jul. 6, 2009.

Dabek, F., et al., Building Peer-to-Peer Systems With Chord, a Distributed Lookup Service, at MIT Laboratory for Computer Science, HOTOS Proceedings of the Eighth Workshop on Hot Topics in Operating Systems, 2001, 6 pages, at http:///pdos.ics.mit.edu/chord.

Druschel, P. et al.; PAST: A large-scale, persistent peer-to-peer storage utility, at Rice University and Microsoft Research, HotOS VIII, Schoss Elmau, Germany, May 2001, 6 pages.

Ellison, C. et al. Simple Public Key Certificate, (Internet Draft 1999), at http://www.world.std.com/~cme/spki.txt (Aug. 6, 2001).

Ellison, C., et al., SPKI Certificate Theory, (The Internet Society 1999), at http://www.ietf.org/rfc/rtc2693.txt?mi,ber=2693 (Aug. 6, 2001).

Ellison, C., SPKI Requirements, (The Internet Society 1999), at http://www.ietf.org/rfc2692.txt?number=2692 (Aug. 6, 2001).

Erdelsky, P., The Birthday Paradox, EFT, at http://www.efgh.com/math/birthday.htm (Mar. 8, 2002).

Lai, K. et al., Measuring Link Bandwidths Using a Deterministic Model of Packet Delay, at Department of Computer Science at Stanford University, in Proceedings of ACM SIGCOMM, 2000, 13 pages.

Langley, A., The Freenet Protocol, The Free Network Project, at http://www/freenet.sourceforge.net/index/php?paqe=protocol (May 2, 2001).

Microsoft Corporation, "Introduction to Windows Peer-to-Peer Networking," Published Jan. 2003.

Press Releases "Linksys Develops and Delivers First Wireless Business Application Product With the Launch of the Wireless Presentation gateway" article retrieved from http://www.linksys.com/press/press.asp?prid=71&cyear=2002 (Apr. 29, 2002).

Red-Black Tree, National Institute of Standards and Technology, at http://www.nist.qov/dads/HTML/redblack.html (Mar. 5, 2002).

Rowstron et al., Pastry: Scalable, distributed object location and routing for large-scale peer-to-peer systems, at Microsoft Research, Ltd., St. George House and Rice University, IFIP/ACM International Conference on Distributed Systems Platforms (Middleware), Heidelberg, Germany, pp. 329-350, Nov. 2001, 20 pages.

Rowstron et al., SCRIBE: The design of a large-scale event notification infrastructure, at Microsoft Research, Ltd., St. George House and Rice University, NGC2001, UCL, London, Nov. 2001, 20 pages.

Rowstron et al., Storage management and caching in PAST, a large-scale, persistent peer-to-peer storage utility, at Microsoft Research, Ltd., St. George House and Rice University, 18th ACM SOSP'01, Lake Louise, Alberta, Canada, Oct. 2001, 14 pages.

UPnP Forum, Documents, Universal Plug and Play Documents retrieved from http://www.upunp.org/resourses/documents.asp on Apr. 17, 2002.

UPnP Forum, Welcome to the Universal Plug and Play Forum! Retrieved from http://www.upnp.org on Apr. 17, 2002.

Wong, Alexander Ya-Li, et al., "Evaluating Windows NT Terminal Server Performance," in Proceddings of $3^{rd}$ Usenix Windows NT Symposium, pp. 145154, Jul. 1999.

* cited by examiner

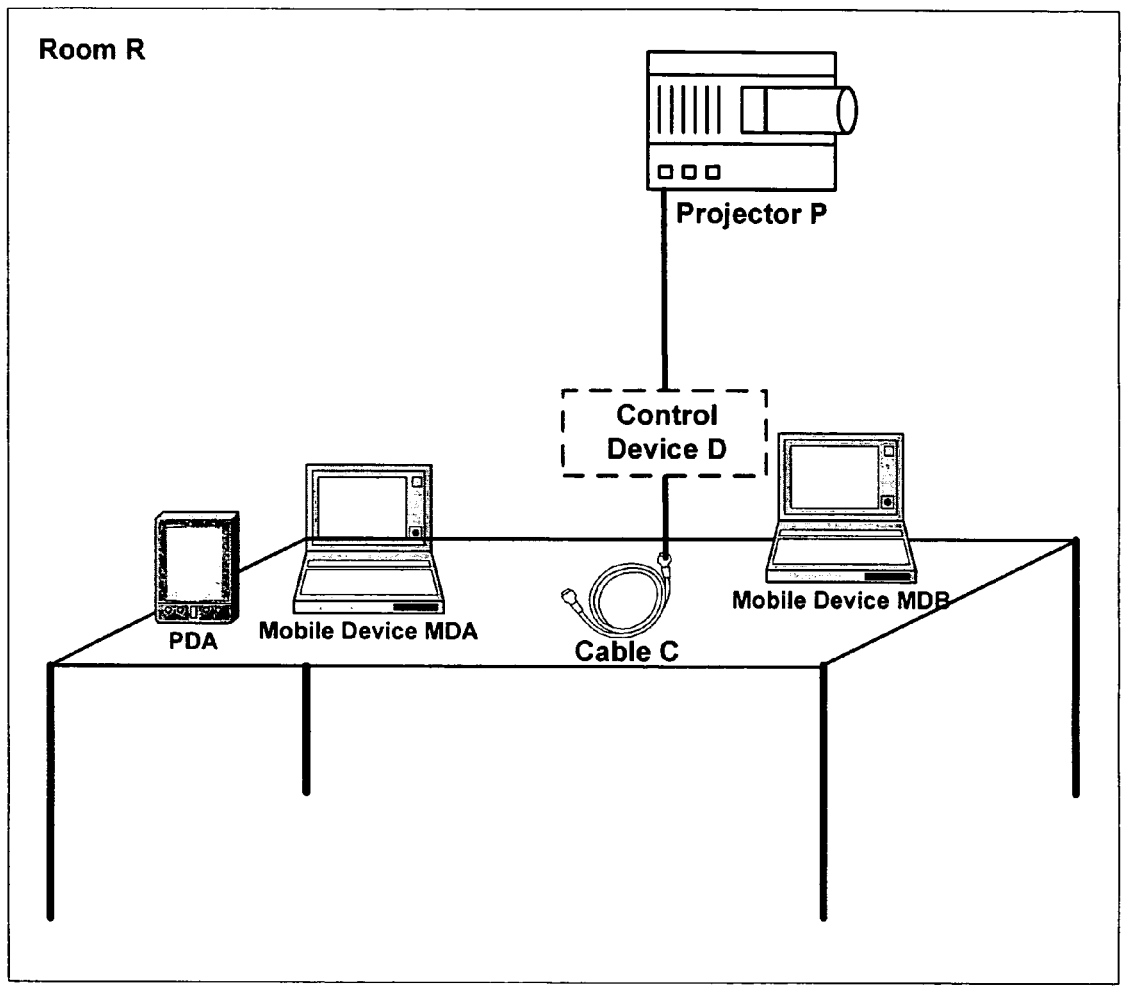
FIG. 1 - Prior Art

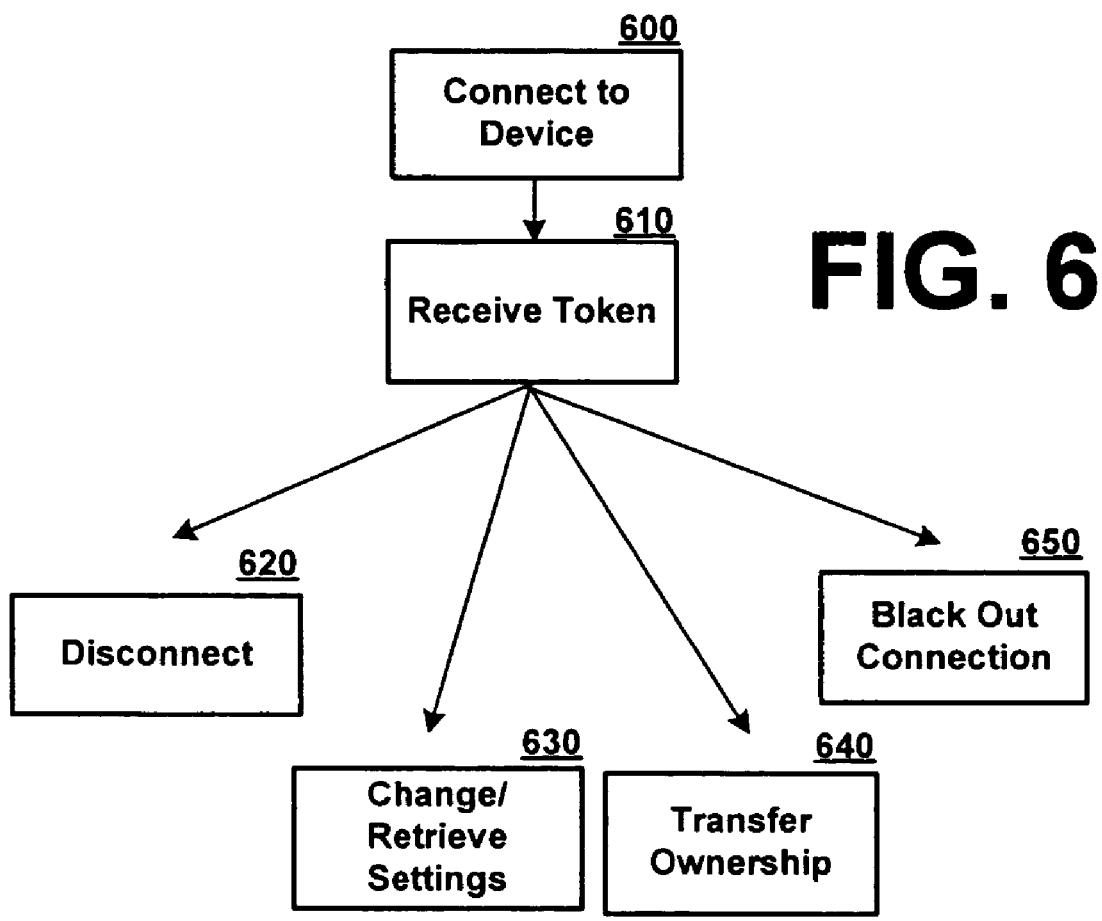

— 800

Agenda

— 810

- Introduction
- Current status
- Options for consideration
- Next Steps

Agenda

— 810

- Introduction
- Current status

SYSTEMS AND METHODS FOR PROJECTING CONTENT FROM COMPUTING DEVICES

CROSS-REFERENCE TO RELATED APPLICATIONS

This application claims the benefit of U.S. Provisional Application No. 60/514,338, filed Oct. 24, 2003, entitled "Systems and Methods for Projecting Content from Computing Devices", which is incorporated by reference herein in its entirety. This application is related to commonly assigned copending U.S. patent application Ser. No. 10/786,833, filed Feb. 25, 2004, entitled "Systems and Methods for Projecting Content from Computing Devices," U.S. patent application Ser. No. 10/179,431, filed Jun. 25, 2002, entitled "Data Projection System and Method," and U.S. patent application Ser. No. 10/692,384, filed Oct. 23, 2003, entitled "One to Many Data Projection System and Method."

COPYRIGHT NOTICE AND PERMISSION

A portion of the disclosure of this patent document may contain material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice shall apply to this document: Copyright © 2003, Microsoft Corp.

FIELD OF THE INVENTION

This invention relates to systems, methods and user interfaces for enabling wireless projection of content from a computing device to an alternate display, such as a projector.

BACKGROUND

Personal computers and portable/mobile computing devices, such as laptop computers, Tablet computers, notebook computers, sub-notebook computers and handheld computing devices, etc., as well as other present and future variants of portable/mobile computing devices, are sometimes used to transmit content to a third party device for manipulation or rendering. Such portable or mobile computing devices will be referred to herein simply as "mobile computing devices" or "mobile devices" without limitation. For instance, mobile devices can be used in situations, such as meetings, to display a presentation on a display, such as a large format display surface, e.g., projector or monitor, in the meeting environment. Currently, when such a situation arises, users making presentations using a mobile computer physically connect the portable/mobile computer via a cable to the projector or to an intermediate electronic system that controls the projector. However, laptop users wanting to present in a conference room must sit close to the projector control and swap VGA, and possibly also audio cables to present. The cord is typically not long enough and causes a musical chairs effect between every presentation as people move around to get the right person close enough to plug in their laptop. A user may then have to adjust screen resolution and/or audio settings each time a new presenter takes control of the projector display. In addition, users ideally want to project their display not just to the conference room projector but also to the laptops of various attendees in the meeting room.

The need to physically connect a cable, however, is undesirable for a variety of reasons. First, it requires a user with the mobile computing device to know that the mobile computing device can connect and also how to connect the mobile computing device, i.e., to know that their mobile computing device includes a connector or port for receiving the projector cable, and that such a connection plus some combination of obscure keystrokes (e.g., function key plus F5 key) switches the output of the portable or mobile computing device from the ordinary display of the mobile computing device to the port. Secondly, anytime one or more physical steps are introduced in a computing process, the time it takes to complete the process increases. For instance, a user must bring the mobile device to the cable, connect the cable, and secure the connection so that disconnection does not happen easily. Moreover, to the extent that male and female connector components are physical components, they are subject to abuse, and ordinary wear and tear. For instance, often the pins of a connector can become bent, damaged, metal fatigued, etc. in which case the connector components, either male or female, may no longer function properly.

In addition, the content/data that is ultimately sent to the projector cannot be simultaneously viewed on the computers of meeting attendees. While wireless technology is rapidly gathering momentum in the marketplace, currently, there is no generic mechanism for receiving wireless data by a display, such as a projector. Moreover, there is no generic mechanism for a mobile device to wirelessly transmit content to a display, such as a projector. Still further, there is no generic mechanism for third party computing devices to receive content.

Accordingly, there is a need in the art to add wireless technology to projectors to allow easy access for mobile users, enabling the ability to bring together a plurality of mobile users into the same room for collaborative meetings and providing a seamless connection where a wired solution is not practical. Furthermore, there is a need in the art to remove issues associated with cabling, making projectors easier to install and tidier, without signal degradation over longer distances. Moreover, there is a need in the art to switch between multiple mobile device sources, for example, if multiple people are presenting from their mobile devices. It would be still further desirable to provide a mechanism and corresponding user interface to allow users to find available wireless projectors or other computers, change or enable settings and connect specified content to them. Similarly, on the receiving side, it would be desirable to include a mechanism and corresponding user interface for users of other computers to accept "projected" content/data from a source mobile computer.

SUMMARY OF THE INVENTION

In consideration of the above-identified shortcomings of the art, the present invention provides systems and methods that enable an alternate display device to wirelessly receive content from a computing device, freeing users from the burden of physically connecting the computing device via a cable. In another aspect, the content capable of being sent to the display device can also be simultaneously or separately viewed on the computing devices of other nearby computing devices. In various embodiments, the invention includes generic mechanism(s) and corresponding user interfaces for computing devices to engage in discovery of devices to which content may be delivered, for accepting delivery of the content where appropriate and for initiating transmission of content.

Other advantages and features of the invention are described below.

BRIEF DESCRIPTION OF THE DRAWINGS

The systems and methods for wirelessly projecting content in accordance with the present invention are further described with reference to the accompanying drawings in which:

FIG. 1 is an exemplary block diagram illustrating a typical prior art scenario;

FIG. 6 illustrates an exemplary flow diagram relating to the process for controlling an alternate display device;

FIGS. 8A-8C illustrate exemplary non-limiting screenshots of various scenarios illustrating a distinction between public and private content in accordance with the invention.

DETAILED DESCRIPTION OF THE INVENTION

Overview

Figure 2A:
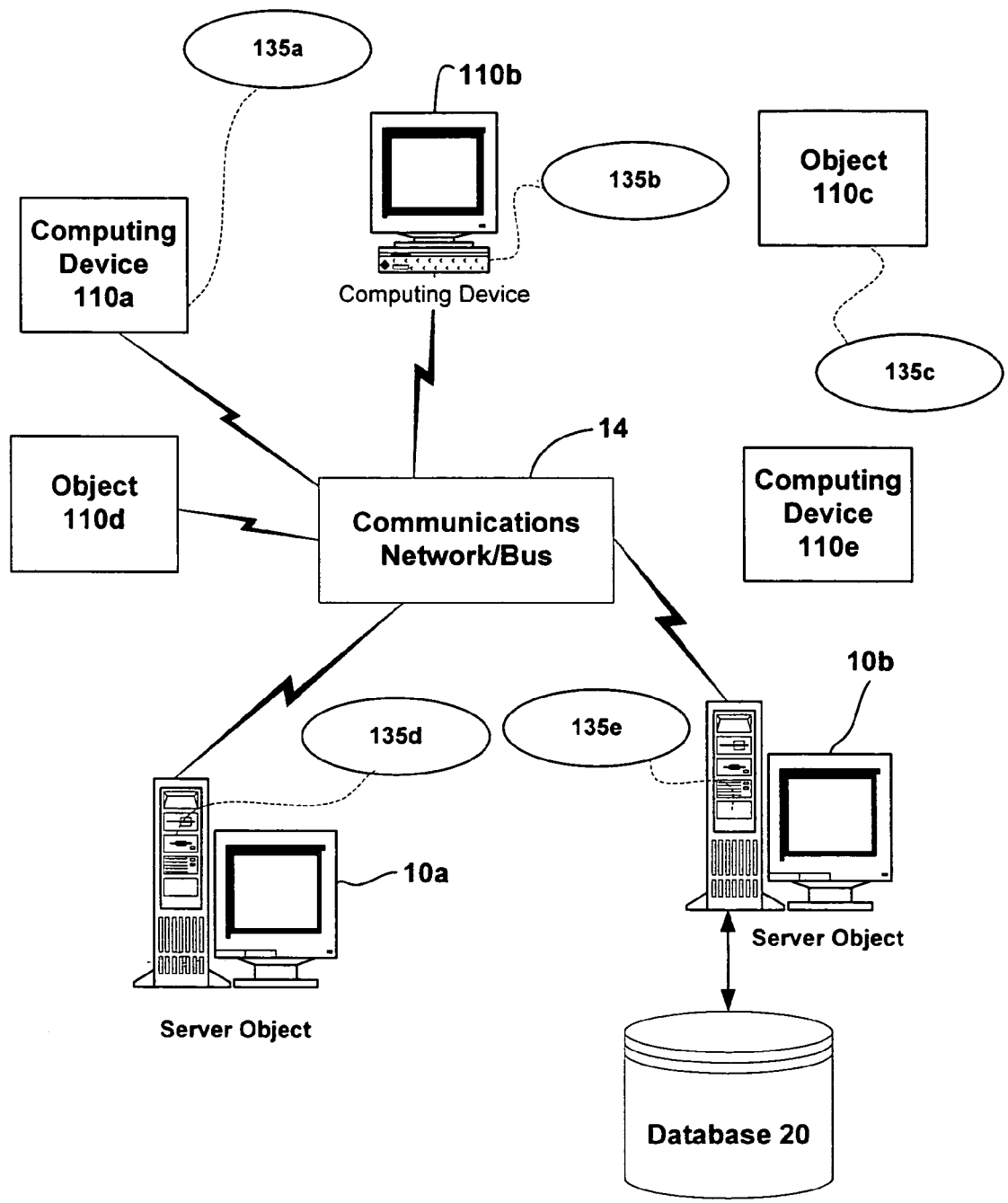
FIG. 2A is a block diagram representing an exemplary network environment having a variety of computing devices in which the present invention may be implemented.

The invention is directed to systems and methods that enable a display device, such as a projector or large display monitor, to wirelessly receive content from a computing device, freeing users from the burden of physically connecting the computing device via a cable. In another aspect, the content capable of being sent to the display device can also be simultaneously or separately viewed on the computing devices of other nearby computing devices. In various embodiments, a projector is provided with wireless functionality, allowing computing devices to wirelessly transmit content in turn to the projector, e.g., useful for collaborative meetings and conference presentations. Since cabling issues are removed, the projector is easier to install, there is no content degradation over significant distances and switching between multiple computing device sources is facilitated. Accordingly, content presenters can be more mobile within the signaling capabilities of wireless technologies, without being tied to physical locations such as "near the projector" or "near a wall socket."

Definitions

The following definitions should be considered an aid in considering one or more terms utilized herein, but not intended to limit the broader meanings of any of the terms as understood by one of ordinary skill in the art.

Wi-Fi (Wireless Fidelity): Wi-Fi technology provides networking using radio technology. Wi-Fi networks operate in the unlicensed 2.4 to 5 GHz radio bands, which has the capacity to transfers data at 11 Mbps, but typically delivers 7 Mbps of real data throughput. This provides performance similar to the basic 10 Base-T wired Ethernet networks used in many offices. Alternate display devices in accordance with the invention include, but are not limited, to Wi-Fi 802.11b technology, currently the most common form of wireless communication in the projector and computer industry.

Peer-to-Peer (Ad Hoc): Wireless configuration in which one or more computers can share a projector equipped with the same wireless capability. Peer-to peer implies that each projector user has the same capabilities and each user can initiate a communication session with the projector (or theoretically each other). Ad hoc is Latin meaning 'for this' or 'for this purpose only,' implying a temporary or spontaneous arrangement, as is the case of mobile wireless computers that come and go from a presentation room. This arrangement allows equal access for all users and thus collaborative meetings or shared presentations are possible.

Alternate Display Device, or Projector Device: The projector device uses both Terminal Services and UPnP. The device exposes the methods that a MRM device uses to control the device and establish a connection via Terminal Services. This could be an actual projector or another device, such as a laptop, hooked to a projector.

RA: Remote Assistance.

Terminal Services (TS): Terminal Services is responsible for the protocol used to "stream" the screen of the user.

UPnP Device Host and Control Point: The Universal Plug and Play (UPnP) protocol is used for discovery of the device. In addition, the device is hosted within the UPnP Device Host service.

RDP Salem Layer: The RDP Salem Layer understands the Remote Assistance "tickets" used for establishing a connection.

Salem Layer for TS: Salem Layer is a current ticket generation layer for Remote Assistance.

Exemplary Networked and Distributed Environments

One of ordinary skill in the art can appreciate that the invention can be implemented in connection with any computer or other client or server device, which can be deployed as part of a computer network, or in a distributed computing environment. In this regard, the present invention pertains to any computer system or environment having any number of memory or storage units, and any number of applications and processes occurring across any number of storage units or volumes, which may be used in connection with wireless transmission of content in accordance with the present invention. The present invention may apply to an environment with server computers and client computers deployed in a network environment or distributed computing environment, having remote or local storage. The present invention may also be applied to standalone computing devices, having programming language functionality, interpretation and execution capabilities for generating, receiving and transmitting information in connection with remote or local services. With network sources for digital media proliferating more than ever, the invention is particularly relevant to those computing devices operating in a network or distributed computing environment, and thus the transmission techniques in accordance with the present invention can be applied with great efficacy in those environments.

Distributed computing provides sharing of computer resources and services by exchange between computing devices and systems. These resources and services include the exchange of information, cache storage and disk storage for files. Distributed computing takes advantage of network connectivity, allowing clients to leverage their collective power and storage to benefit the entire enterprise. In this regard, a variety of devices may have applications, objects or resources that may implicate the ability to wirelessly project content via the invention.

FIG. 2A provides a schematic diagram of an exemplary networked or distributed computing environment. The distributed computing environment comprises computing objects 10a, 10b, etc. and computing objects or devices 110a, 110b, 110c, etc. These objects may comprise programs, methods, data stores, programmable logic, etc. The objects may comprise portions of the same or different devices such as PDAs, audio/video devices, MP3 players, personal computers, etc. Each object can communicate with another object by way of the communications network 14. This network may itself comprise other computing objects and computing devices that provide services to the system of FIG. 2A, and may itself represent multiple interconnected networks. In accordance with an aspect of the invention, each of the objects 10a, 10b, etc. or 110a, 110b, 110c, etc. may contain an application that might make use of an interface, such as an API, or other object, software, firmware and/or hardware, to request or make use of the wireless content projection processes in accordance with the invention.

It can also be appreciated that an object, such as 110c, may be hosted on another computing device 10a, 10b, etc. or 110a, 110b, etc. Thus, although the physical environment depicted may show the connected devices as computers, such illustration is merely exemplary and the physical environment may alternatively be depicted or described comprising various digital devices such as PDAs, televisions, MP3 players, etc., software objects such as interfaces, COM objects, or any device that may be utilized in connection with a media experience.

There are a variety of systems, components, and network configurations that support distributed computing environments. For example, computing systems may be connected together by wired or wireless systems, by local networks or widely distributed networks. Currently, many of the networks are coupled to the Internet, which provides an infrastructure for widely distributed computing and encompasses many different networks. Any of the infrastructures may be used for exemplary communications made incident to the provision of wireless content projection according to the present invention.

In home networking environments, there are at least four disparate network transport media that may each support a unique protocol, such as Power line, data (both wireless and wired), voice (e.g., telephone) and entertainment media. Most home control devices such as light switches and appliances may use power lines for connectivity. Data Services may enter the home as broadband (e.g., either DSL or Cable modem) and are accessible within the home using either wireless (e.g., HomeRF or 802.11B) or wired (e.g., Home PNA, Cat 5, Ethernet, even power line) connectivity. Voice traffic may enter the home either as wired (e.g., Cat 3) or wireless (e.g., cell phones) and may be distributed within the home using Cat 3 wiring. Entertainment media, or other graphical data, may enter the home either through satellite or cable and is typically distributed in the home using coaxial cable. IEEE 1394 and DVI are also digital interconnects for clusters of media devices. All of these network environments and others that may emerge as protocol standards may be interconnected to form a network, such as an intranet, that may be connected to the outside world by way of the Internet. In short, a variety of disparate sources exist for the storage and transmission of data, and consequently, moving forward, computing devices will require ways of sharing data, such as data accessed or utilized incident to program objects, which request or make use of the wireless content transmission mechanism(s) in accordance with the present invention.

The Internet commonly refers to the collection of networks and gateways that utilize the TCP/IP suite of protocols, which are well-known in the art of computer networking. TCP/IP is an acronym for "Transmission Control Protocol/Internet Protocol." The Internet can be described as a system of geographically distributed remote computer networks interconnected by computers executing networking protocols that allow users to interact and share information over the network(s). Because of such wide-spread information sharing, remote networks such as the Internet have thus far generally evolved into an open system for which developers can design software applications for performing specialized operations or services, essentially without restriction.

Thus, the network infrastructure enables a host of network topologies such as client/server, peer-to-peer, or hybrid architectures. The "client" is a member of a class or group that uses the services of another class or group to which it is not related. Thus, in computing, a client is a process, i.e., roughly a set of instructions or tasks, that requests a service provided by another program. The client process utilizes the requested service without having to "know" any working details about the other program or the service itself. In a client/server architecture, particularly a networked system, a client is usually a computer that accesses shared network resources provided by another computer, e.g., a server. In the example of FIG. 2A, computers 110a, 110b, etc. can be thought of as clients and computers 10a, 10b, etc. can be thought of as the server where server 10a, 10b, etc. maintains the data that is then replicated in the client computers 120a, 110b, etc., although any computer can be considered a client, a server, or both, depending on the circumstances. For instance, computer 110a may be a laptop, and computing devices 10a, 10b, etc. may be remote media devices, or alternate display devices. Any of these computing devices may be processing data or requesting services or tasks that may implicate the wireless transmission/reception of content in accordance with the invention.

A server is typically a remote computer system accessible over a remote or local network, such as the Internet. The client process may be active in a first computer system, and the server process may be active in a second computer system, communicating with one another over a communications medium, thus providing distributed functionality and allowing multiple clients to take advantage of the information-gathering capabilities of the server. Any software objects utilized pursuant to the invention may be distributed across multiple computing devices or objects.

Client(s) and server(s) communicate with one another utilizing the functionality provided by protocol layer(s). For example, HyperText Transfer Protocol (HTTP) is a common protocol that is used in conjunction with the World Wide Web (WWW), or "the Web." For instance, remote desktop protocol (RDP) is a common protocol utilized for remote computing. Typically, a computer network address such as an Internet Protocol (IP) address or other reference such as a Universal Resource Locator (URL) can be used to identify the server or client computers to each other. The network address can be referred to as a URL address. Communication can be provided over a communications medium, e.g., client(s) and server(s) may be coupled to one another via TCP/IP connection(s) for high-capacity communication.

Thus, FIG. 2A illustrates an exemplary networked or distributed environment, with a server in communication with client computers via a network/bus, in which the present invention may be employed. In more detail, a number of servers 10a, 10b, etc., are interconnected via a communications network/bus 14, which may be a LAN, WAN, intranet, the Internet, etc., with a number of client or remote computing devices 110a, 110b, 110c, 110d, 110e, etc., such as a portable computer, handheld computer, thin client, networked appliance, or other device, such as a VCR, TV, oven, light, heater and the like in accordance with the present invention. It is thus contemplated that the present invention may apply to any computing device having media abilities when it comes to storage, creation, user interface, rendering, etc.

In a network environment in which the communications network/bus 14 is the Internet, for example, the servers 10a, 10b, etc. can be Web servers with which the clients 110a, 110b, 110c, 110d, 110e, etc. communicate via any of a number of known protocols such as HTTP. Servers 10a, 10b, etc. may also serve as clients 110a, 110b, 110c, 110d, 110e, etc., as may be characteristic of a distributed computing environment.

Communications may be wired or wireless, where appropriate. Client devices 110a, 110b, 110c, 110d, 110e, etc. may or may not communicate via communications network/bus 14, and may have independent communications associated therewith. For example, in the case of a TV or VCR, there may or may not be a networked aspect to the control thereof. Each client computer 110a, 110b, 110c, 110d, 110e, etc. and server computer 10a, 10b, etc. may be equipped with various application program modules or objects 135 and with connections or access to various types of storage elements or objects, across which files or data streams may be stored or to which portion(s) of files or data streams may be downloaded, transmitted or migrated. Any one or more of computers 10a, 10b, 110a, 110b, etc. may be responsible for the maintenance and updating of a database 20 or other storage element, such as a database or memory 20 for storing data processed according to the invention. Thus, the present invention can be utilized in a computer network environment having client computers 110a, 110b, etc. that can access and interact with a computer network/bus 14 and server computers 10a, 10b, etc. that may interact with client computers 110a, 110b, etc. and other like devices, and databases 20.

Exemplary Computing Device

Figure 2B:
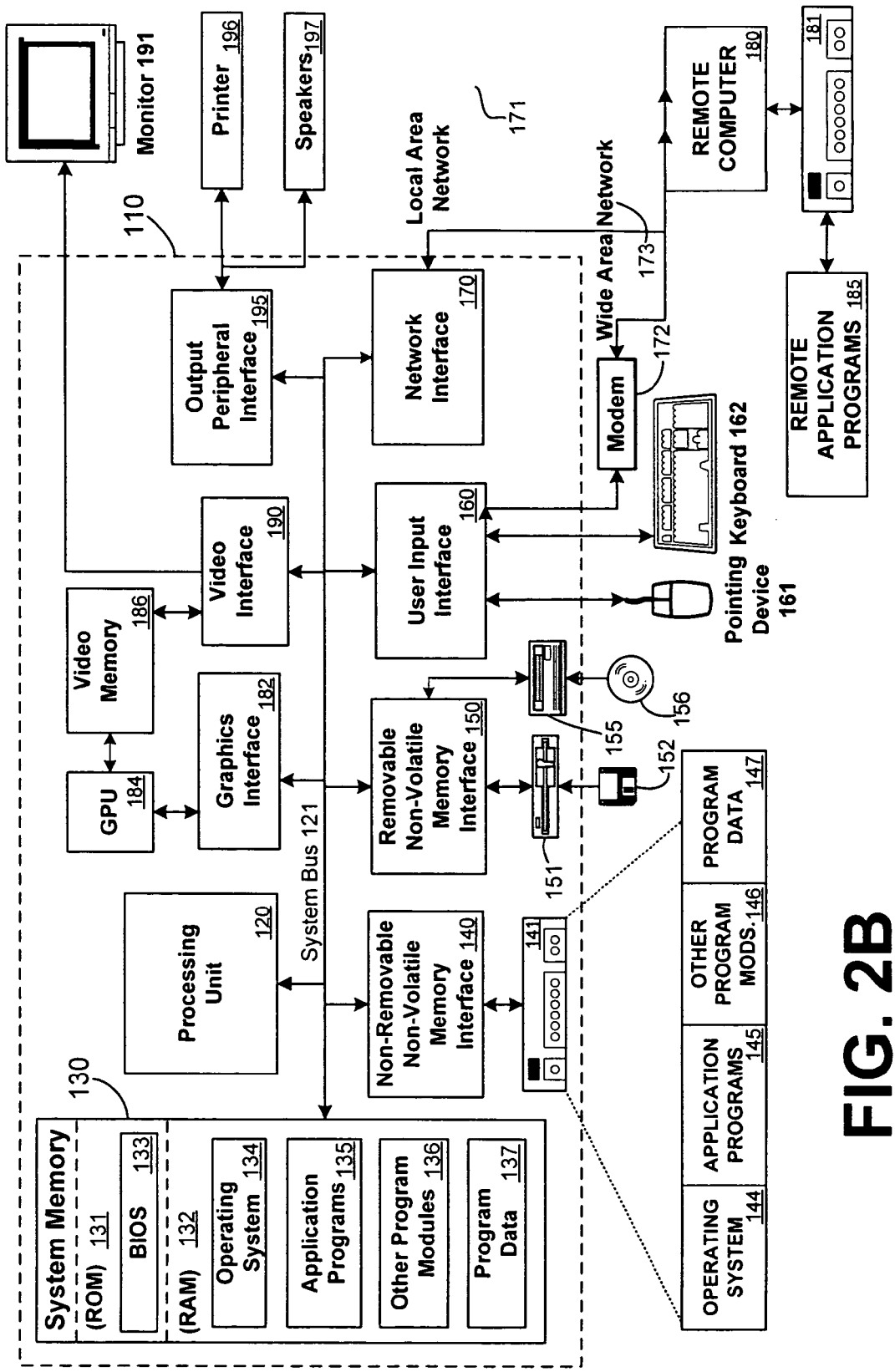
FIGS. 2B and 2C are block diagrams representing exemplary non-limiting computing devices in which the present invention may be implemented.

FIG. 2B and the following discussion are intended to provide a brief general description of a suitable computing environment in connection with which the invention may be implemented. It should be understood, however, that handheld, portable and other computing devices and computing objects of all kinds are contemplated for use in connection with the present invention, i.e., anywhere where that media may be experienced in a computing environment. While a general purpose computer is described below as an exemplary host, this is but one example, and the present invention may be implemented with a thin client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance. In essence, anywhere that data or content may be stored or from which data may be retrieved or transmitted to another computer is a desirable, or suitable, environment for operation of the wireless delivery of content in accordance with the invention.

Although not required, the invention can be implemented via an operating system, for use by a developer of services for a device or object, and/or included within application software that operates in connection with the wireless delivery of content in accordance with the invention. Software may be described in the general context of computer-executable instructions, such as program modules, being executed by one or more computers, such as client workstations, servers or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations and protocols. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, appliances, lights, environmental control elements, minicomputers, mainframe computers and the like. The invention may also be practiced in distributed computing environments where tasks are performed by remote processing devices that are linked through a communications network/bus or other data transmission medium. In a distributed computing environment, program modules may be located in both local and remote computer storage media including memory storage devices, and client nodes may in turn behave as server nodes.

FIG. 2B thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 2B, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 2B illustrates operating system 134, application programs 135, other program modules 136, and program data 137.

The computer 110 may also include other removable/non-removable, volatile/nonvolatile computer storage media. By way of example only, FIG. 2B illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 2B provide storage of computer readable instructions, data structures, program modules and other data for the computer 110. In FIG. 2B, for example, hard disk drive 141 is illustrated as storing operating system 144, application programs 145, other program modules 146 and program data 147. Note that these components can either be the same as or different from operating system 134, application programs 135, other program modules 136 and program data 137. Operating system 144, application programs 145, other program modules 146 and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186, wherein the application variables of the invention may have impact. GPUs 184, however, are but one example of a coprocessor and thus a variety of coprocessing devices may be included in computer 110, and may include a variety of procedural shaders, such as pixel and vertex shaders. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked or distributed environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 2B. The logical connections depicted in FIG. 2B include a local area network (LAN) 171 and a wide area network (WAN) 173, but may also include other networks/buses. Such networking environments are commonplace in homes, offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 2B illustrates remote application programs 185 as residing on memory device 181. It will be appreciated that the network connections shown are exemplary and other means of establishing a communications link between the computers may be used.

Exemplary Alternate Devices

Figure 2C:
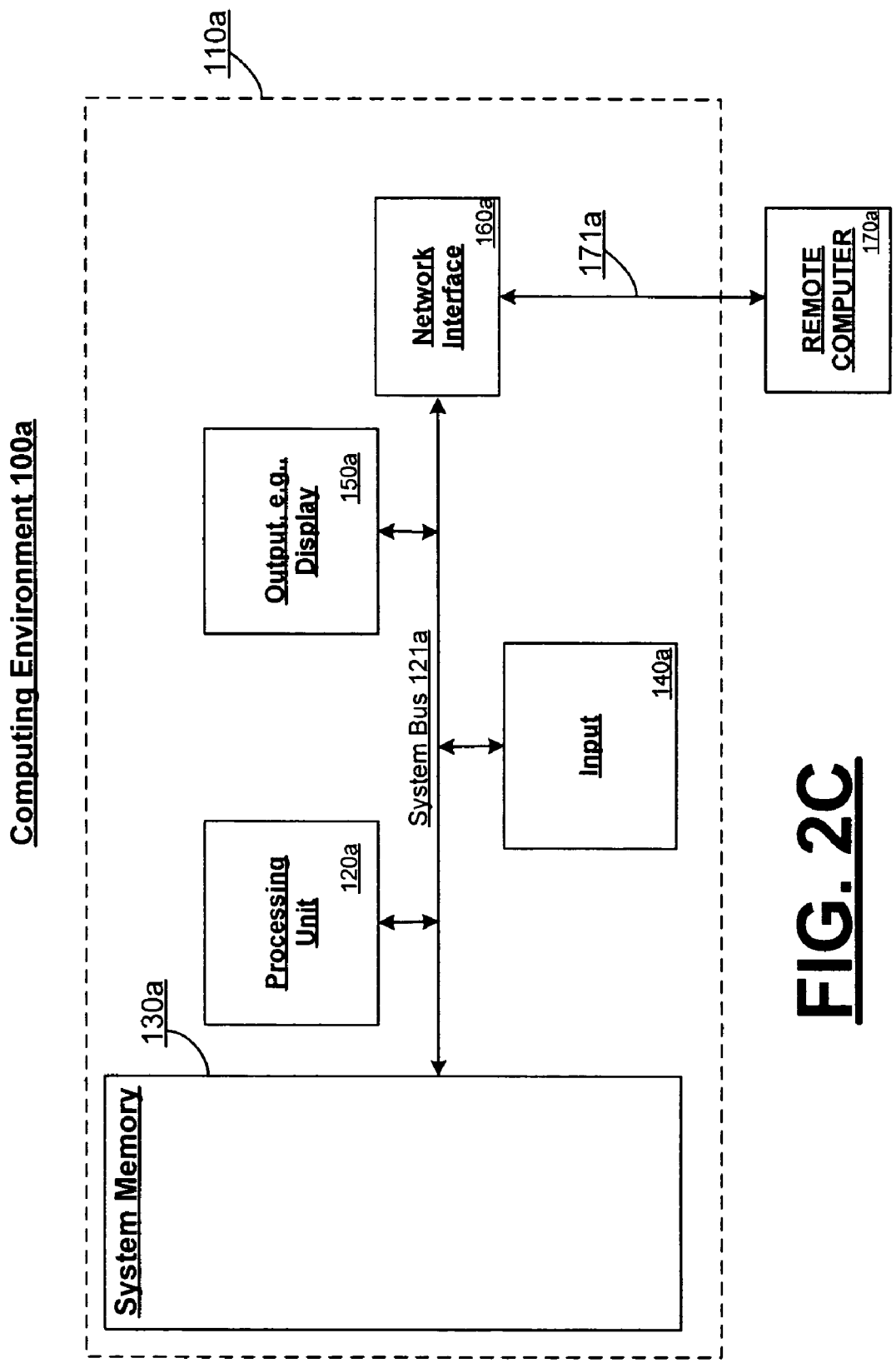

As mentioned, the invention applies to any device wherein it may be desirable to wirelessly project content from one computing device to the display of another computing device. FIG. 2C and the following discussion are thus intended to supplement the general description of FIG. 2B. It should be understood, therefore, that handheld, portable and other computing devices and computing objects of all kinds are contemplated for use in connection with the present invention, i.e., anywhere that a device may wish to wirelessly deliver content to an alternate display. Accordingly, the below general purpose remote computer described below is but one example, and the present invention may be implemented with any client having network/bus interoperability and interaction. Thus, the present invention may be implemented in an environment of networked hosted services in which very little or minimal client resources are implicated, e.g., a networked environment in which the client device serves merely as an interface to the network/bus, such as an object placed in an appliance.

Although not required, the invention can partly be implemented via an operating system, for use by a developer of services for a device or object, and/or included within application software that operates in connection with the component(s) of the invention. Software may be described in the general context of computer-executable instructions, such as program modules, being executed by one or more computers, such as client workstations, servers or other devices. Those skilled in the art will appreciate that the invention may be practiced with other computer system configurations and protocols.

FIG. 2C thus illustrates an example of a suitable computing system environment $100a$ in which the invention may be implemented, although as made clear above, the computing system environment $100a$ is only one example of a suitable computing environment for a media device and is not intended to suggest any limitation as to the scope of use or functionality of the invention. Neither should the computing environment 100 be interpreted as having any dependency or requirement relating to any one or combination of components illustrated in the exemplary operating environment $100a$.

With reference to FIG. 2C, an exemplary remote device for implementing the invention includes a general purpose computing device in the form of a computer $110a$. Components of computer $110a$ may include, but are not limited to, a processing unit $120a$, a system memory $130a$, and a system bus $121a$ that couples various system components including the system memory to the processing unit $120a$. The system bus $121a$ may be any of several types of bus structures including a memory bus or memory controller, a peripheral bus, and a local bus using any of a variety of bus architectures.

Computer $110a$ typically includes a variety of computer readable media. Computer readable media can be any available media that can be accessed by computer $110a$. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media.

The system memory $130a$ may include computer storage media in the form of volatile and/or nonvolatile memory such as read only memory (ROM) and/or random access memory (RAM). A basic input/output system (BIOS), containing the basic routines that help to transfer information between elements within computer 110, such as during start-up, may be stored in memory $130a$. Memory $130a$ typically also contains data and/or program modules that are immediately accessible to and/or presently being operated on by processing unit $120a$. By way of example, and not limitation, memory $130a$ may also include an operating system, application programs, other program modules, and program data.

The computer $110a$ may also include other removable/non-removable, volatile/nonvolatile computer storage media. For example, computer $110a$ could include a hard disk drive that reads from or writes to non-removable, nonvolatile magnetic media, a magnetic disk drive that reads from or writes to a removable, nonvolatile magnetic disk, and/or an optical disk drive that reads from or writes to a removable, nonvolatile optical disk, such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM and the like. A hard disk drive is typically connected to the system bus $121a$ through a non-removable memory interface such as an interface, and a magnetic disk drive or optical disk drive is typically connected to the system bus 121 by a removable memory interface, such as an interface.

A user may enter commands and information into the computer $110a$ through input devices such as a keyboard and pointing device, commonly referred to as a mouse, trackball or touch pad. Other input devices may include a microphone, joystick, game pad, satellite dish, scanner, or the like. These and other input devices are often connected to the processing unit $120a$ through user input $140a$ and associated interface(s) that are coupled to the system bus $121a$, but may be connected by other interface and bus structures, such as a parallel port, game port or a universal serial bus (USB). A graphics subsystem may also be connected to the system bus $121a$. A monitor or other type of display device is also connected to the system bus $121a$ via an interface, such as output interface $150a$, which may in turn communicate with video memory. In addition to a monitor, computers may also include other peripheral output devices such as speakers and a printer, which may be connected through output interface $150a$.

The computer $110a$ may operate in a networked or distributed environment using logical connections to one or more other remote computers, such as remote computer $170a$, which may in turn have media capabilities different from device $110a$. The remote computer $170a$ may be a personal computer, a server, a router, a network PC, a peer device or other common network node, or any other remote media consumption or transmission device, and may include any or all of the elements described above relative to the computer $110a$. The logical connections depicted in FIG. 2C include a network $171a$, such local area network (LAN) or a wide area network (WAN), but may also include other networks/buses. Such networking environments are commonplace in homes, offices, enterprise-wide computer networks, intranets and the Internet.

When used in a LAN networking environment, the computer $110a$ is connected to the LAN $171a$ through a network interface or adapter. When used in a WAN networking environment, the computer $110a$ typically includes a modem or other means for establishing communications over the WAN, such as the Internet. A modem, which may be internal or external, may be connected to the system bus $121a$ via the user input interface of input $140a$, or other appropriate mechanism. In a networked environment, program modules depicted relative to the computer $110a$, or portions thereof, may be stored in a remote memory storage device. It will be appreciated that the network connections shown and described are exemplary and other means of establishing a communications link between the computers may be used.

Exemplary Distributed Computing Frameworks or Architectures

Various distributed computing frameworks have been and are being developed in light of the convergence of personal computing and the Internet. Individuals and business users alike are provided with a seamlessly interoperable and Web-enabled interface for applications and computing devices, making computing activities increasingly Web browser or network-oriented.

For example, MICROSOFT®'s managed code platform, i.e., .NET, includes servers, building-block services, such as Web-based data storage and downloadable device software. Generally speaking, the .NET platform provides (1) the ability to make the entire range of computing devices work together and to have user information automatically updated and synchronized on all of them, (2) increased interactive capability for Web pages, enabled by greater use of XML rather than HTML, (3) online services that feature customized access and delivery of products and services to the user from a central starting point for the management of various applications, such as e-mail, for example, or software, such as Office .NET, (4) centralized data storage, which increases efficiency and ease of access to information, as well as synchronization of information among users and devices, (5) the ability to integrate various communications media, such as e-mail, faxes, and telephones, (6) for developers, the ability to create reusable modules, thereby increasing productivity and reducing the number of programming errors and (7) many other cross-platform and language integration features as well.

While some exemplary embodiments herein are described in connection with software residing on a computing device, one or more portions of the invention may also be implemented via an operating system, application programming interface (API) or a "middle man" object, a control object, hardware, firmware, intermediate language instructions or objects, etc., such that the methods of the invention may be included in, supported in or accessed via all of the languages and services enabled by managed code, such as .NET code, and in other distributed computing frameworks as well.

Overview of Remote Desktop Protocol and Terminal Server Sessions

The Microsoft Remote Desktop Protocol (RDP) is one example of a protocol that can be used to port a media experience from a host to a remote media consumption device. RDP provides remote display and input capabilities over network connections for Windows-based applications running on a server. RDP is designed to support different types of network topologies and multiple LAN protocols.

On the server, RDP uses its own video driver to render display output by constructing the rendering information into network packets using the protocol and sending them over the network to the client. On the client, RDP receives rendering data and interprets the packets into corresponding graphics device interface API calls. For the input path, client mouse and keyboard events are redirected from the client to the server. On the server, RDP uses its own virtual keyboard and mouse-driver to receive the keyboard and mouse events. From a non-limiting feature standpoint, RDP includes encryption, bandwidth reduction features, roaming disconnect, clipboard mapping, print redirection, virtual channels, remote control and network load balancing.

Terminal Server provides an exemplary remote computing environment as an extension of a server, such as Windows NT Server. With merely a thin client, users can experience the server desktop operating system and applications completely off the server. With Terminal Server, users are provided access to Windows-based applications from any of the following types of desktops: (A) low-cost hardware, commonly referred to as Windows-based terminals, which are marketed by third-party hardware vendors, (B) Windows desktop operating systems, such as Windows 95 or Microsoft Windows NT Workstation by running the Terminal Server client as a window within the local desktop environment, and (C) X-based Terminals, UNIX-based desktops as well as Apple Macintosh, MS-DOS and other networked computers (through add-on software).

Terminal Server comprises three main components: the Terminal Server multiuser core, the Remote Desktop Protocol (RDP) and the thin client software.

Terminal Server is the multiuser server core that provides the ability to host multiple, simultaneous client sessions on other devices. Terminal Server is capable of directly hosting compatible multiuser client desktops running on a variety of Windows-based and non-Windows-based hardware. Standard Windows-based applications do not need modification to run on the Terminal Server, and all standard Windows NT-based management infrastructure and technologies can be used to manage the client desktops. In this way, corporations can take advantage of the rich choice of applications and tools offered by the Windows environment.

RDP is the protocol of Terminal Server that allows a thin client to communicate with the Terminal Server over the network. This protocol is based on the International Telecommunications Union (ITU) T.120 protocol, an international, standard multichannel conferencing protocol. RDP is tuned for high-bandwidth enterprise environments and also supports encrypted sessions.

The thin client component is software that presents, or displays, a Windows user interface on a range of desktop hardware including Windows-based terminal devices and personal computers.

An Object Manager of Terminal Server provides that applications and system programs of different sessions do not collide. Every object name created within a session is appended with a unique identifier number associated with the individual session that created it (SessionID). The Terminal Server service is entirely protocol-independent, so it can function using RDP or a third-party add-on protocol such as Citrix's ICA.

RDP is a multichannel capable protocol allowing for separate virtual channels for carrying serial device communication and presentation data from the server, as well as encrypted client mouse and keyboard data. Virtual channels are software extensions that can be used to add functional enhancements to a Terminal Services application. Examples of functional enhancements might include: support for special types of hardware, audio, or other additions to the core functionality provided by the Terminal Services RDP. RDP provides multiplexed management of multiple virtual channels.

A virtual channel application has two parts, a client-side component and a server-side component. The server-side component is an executable program running on the Terminal Server. The client-side component is a DLL that is loaded into memory on the client computer when the Terminal Services client program runs.

Virtual channels can add functional enhancements to a Terminal Services client, independent of the RDP protocol.

With virtual channel support, new features can be added without having to update the client or server software, or the RDP protocol.

Several other capabilities are also part of the T.120 standards definition, including, for example, multipoint data delivery, which allows data from an application to be delivered "real-time" to multiple parties. Multicast-enabled delivery allows for reliable delivery services of data transmissions. It increases the performance for the customer while at the same time reducing the load on the network infrastructure. RDP is beneficial for connectivity purposes because it provides an extensible base from which to build more abilities. This is in part because RDP provides up to 64,000 separate channels for data transmission, as well as provisions for multipoint transmission.

RDP is designed to support many different types of Network topologies, such as ISDN, POTS, and many LAN protocols, such as IPX, Netbios, TCP/IP, and so forth.

The activity involved in sending and receiving data through the RDP stack is essentially the same as the seven-layer OSI (open systems interconnection) model standards for common LAN networking today. Data from an application or service to be transmitted is passed down through the protocol stacks, sectioned, directed to a channel, encrypted, wrapped, framed, packaged onto the network protocol, and finally addressed and sent over the wire to the client.

The return data works the same way in reverse, with the packet being stripped of its address, then unwrapped, decrypted, and so on, until the data is presented to the application for use. Some portions of the protocol stack modifications occur between the 4th and 7th layers, where the data is encrypted, wrapped and framed, directed to a channel, and prioritized.

With RDP, advantageously, the complexities of dealing with the Protocol stack are abstracted away from the application developer. The application developer simply writes the application, and the RDP stack implemented by the Terminal Server and its client connections takes care of the rest.

When starting, Terminal Server boots and loads the core operating system, and the Terminal Server service is started and begins waiting for session connections. Each connection is given a unique session identifier or "SessionID," to represent an individual session to the Terminal Server and each process created within a session is "tagged" with the associated SessionID to differentiate its namespace from other session namespaces. When a user logs on to a Terminal Services-enabled computer, a session is started for the user, identified by unique session ID. Because each logon to a Terminal Services client receives a separate session ID, the user-experience is similar to being logged on to multiple computers at the same time, e.g., an office computer and a home computer.

The console (Terminal Server keyboard, mouse, and video) session is the first to load and is treated as a special-case client connection and assigned SessionID0. The console session starts as a normal system session, with the configured display, mouse, and keyboard drivers loaded.

After creating the console session, the Terminal Server service then calls the Session Manager to create two (by default) idle client sessions awaiting client connections. To create the idle sessions, the Session Manager executes the client server run-time subsystem process, and a new SessionID is assigned to that process.

Unlike the console session, client sessions are configured to load separate drivers for the display, keyboard, and mouse. The new display driver is the Remote Desktop Protocol (RDP) display device driver, and the mouse and keyboard drivers are replaced with the RDP driver. These drivers allow the RDP client session to be both available and interactive, remotely. Finally, Terminal Server also invokes a connection listener thread for the RDP protocol, which listens for RDP client connections on a TCP port. Processes with different SessionIDs are prevented from accessing another session's data.

In an exemplary implementation, the client initiates a connection to the Terminal Server through the TCP port. The Terminal Server RDP listener thread detects the session request and creates a new RDP stack instance to handle the new session request. The listener thread hands over the incoming session to the new RDP stack instance and continues listening on the TCP port for further connection attempts. Each RDP stack is created as the client sessions are connected to handle negotiation of session configuration details.

After user logon, the desktop, or application, if in single application mode, is displayed for the user. When the user selects an application to run, the mouse commands are passed to the Terminal Server, which launches the selected application into a new virtual memory space.

If a user decides to disconnect the session, the processes and all virtual memory space remain and are paged off to the physical disk if physical memory is required for other processes. An additional benefit of RDP is that of being able to change session screen resolutions, depending on what the user requests for the session. For example, if a user had previously connected to a Terminal Server session at 800×600 resolution and disconnected, and then moved to a different computer that only supported 640×480 resolution and reconnected to the existing session, the desktop would be redrawn to support the new resolution.

Logoff is typically very simple to implement. Once a user logs off from the session, all processes associated with the SessionID are terminated and any memory allocated to the session is released.

Systems and Methods for Wirelessly Transmitting and Receiving Content

In one aspect, the invention enables a display device, such as a projector or large display monitor, to include wireless technology, allowing the display device to receive content/data from a mobile computing device. Thus, users can need not physically connect the mobile device to a cable. In another aspect, the content/data that is being sent to the display device from a mobile device can be simultaneously viewed on the computing devices of meeting attendees. Wireless technology is rapidly gathering momentum in the projector marketplace. With a projector manufactured with wireless functionality, such as Wi-Fi, in "ad-hoc" mode, projectors allow easy access for mobile users to provide content. Such a projector provides the ability to bring together a plurality of mobile users into the same room, or room(s) near enough for wireless technology, for collaborative meetings. Additionally, the invention provides an easy connection where a wired solution is not practical, i.e., cabling issues are removed.

Thus, with the invention, a projector is easier to install, tidier and there is no signal loss or degradation over significant distances. With the invention, it is also easier to switch between multiple PC sources, for instance, if there are multiple people presenting from their own laptops. Accordingly, presenters can be more mobile in the room, or otherwise within the capabilities of wireless technologies, and they do not have to be near the projector or near a wall socket. In one embodiment of the invention, by including wireless technology, such as Wi-Fi, capable of projecting to a projector or other mobile device in the operating system of a mobile device, the mobile device is able to project wirelessly without the need for additional installation of software or hardware to the mobile device.

In one embodiment, the invention leverages wireless technology built into projectors and uses Universal Plug and Play (UPnP) to advertise the projector's presence, users portable/mobile computer to find, and control the projectors. The invention can utilize a Terminal Service session to connect the display to the user's machine.

The invention facilitates a great integrated experience between portable/mobile computer drives projectors and the displays of other portable/mobile computers. Adding wireless capability to projectors allows easy access for mobile users, providing the ability to bring together a number of mobile users into the same room for collaborative meetings, and providing an easy connection where a wired solution is not practical. Cabling issues are removed, therefore the projector is easier to install, tidier, and there is no signal loss over longer distances. It is much easier to switch between multiple PC sources, especially if multiple people are presenting from their own laptops and presenters can be more mobile in the room—they do not have to be near the projector or near a wall socket.

One of the main benefits of wireless technology in accordance with the invention can be seen in a room with multiple presenters, where each speaker previously had to plug their laptop into a projector connection and unplug it when each was finished, i.e., with the invention, collaborative group presentations can be achieved without switching cables. Three scenarios enabled by the invention include Mirror, Extended Monitor and 1:N. In an exemplary Mirror scenario, Melissa walks into a conference room and sets her laptop in meeting mode. Her machine discovers the projector in the conference room. She wirelessly projects the slide show on her laptop as-is on the projector. After she is done presenting her slides, she disconnects from the projector for another meeting attendee to use the projector. Many examples are given herein, none of which should be considered limiting on the invention. For instance, the Extended scenario can be achieved in either of the 1:1 or 1:n projection circumstances. The Mirror scenario can also be achieved in the 1:1 and 1:n projection circumstance, i.e., they are not exclusive scenarios.

In a typical Extended Monitor scenario, Patrick sets his laptop in the meeting mode as he enters the client's conference room. His machine discovers the wireless projector in the room. By enabling the projector to be used in an extended multi-monitor fashion, the projector projects the presentation, while Patrick's laptop shows his notes. Effectively, Patrick's display is disaggregated so it can be used as a second monitor.

In a typical 1:N scenario, Fred meets his colleagues at the airport lobby who all have laptops, or other computing devices, that include software according to the invention, e.g., in the operating system, or as an application. As a result, Fred can easily project his slides on all his colleagues' laptops, and/or a projector, if one is available.

Thus, the solution of the invention represents a simple user interface (UI) that allows users to find available wireless projectors or other computers, make settings and connect to them. In addition, the invention includes a UI for the users of other computers to accept "projected" content/data from the source portable/mobile computer.

Figure 3:
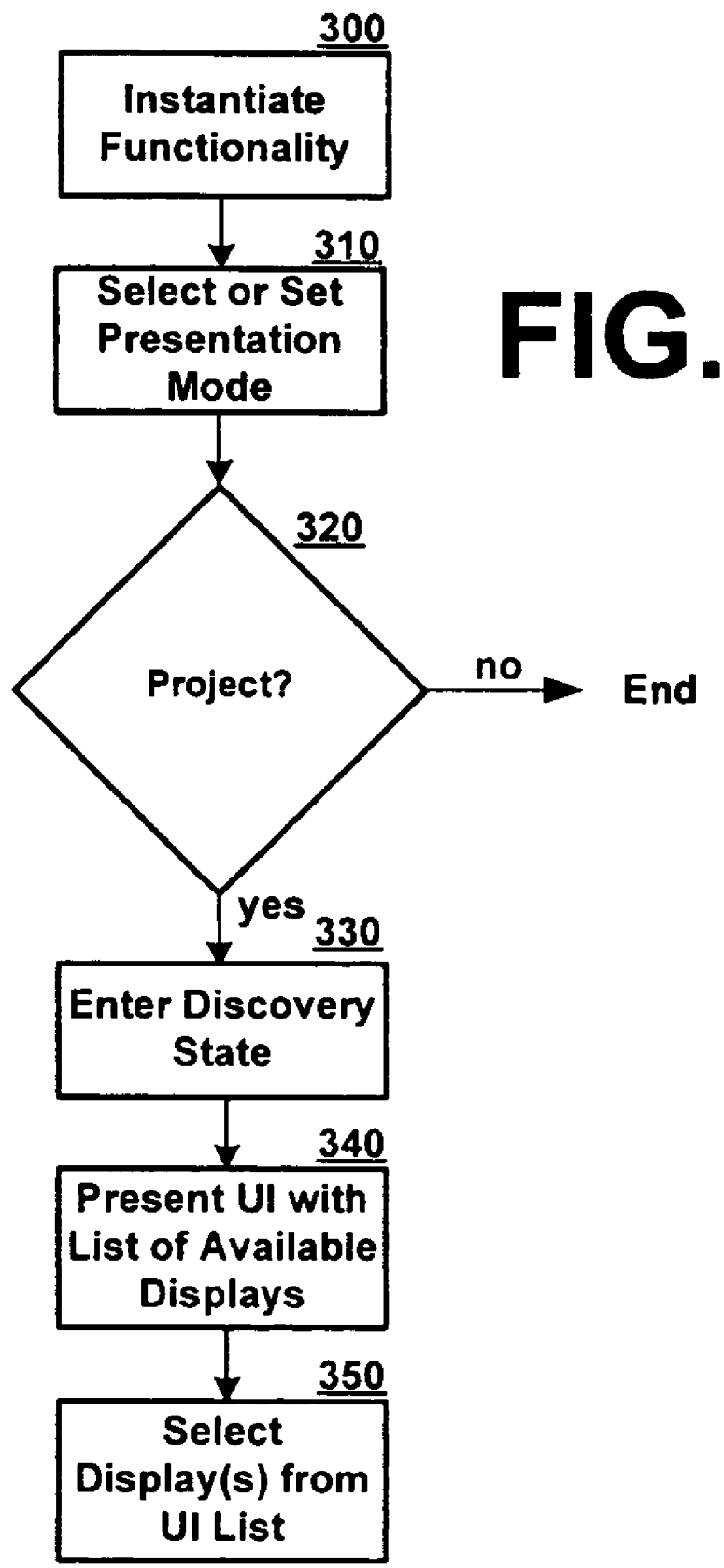
FIG. 3 illustrates an exemplary sequence for launching a wireless projection application in accordance with the invention.

FIG. 3 illustrates an exemplary sequence for launching a wireless projection application in accordance with the invention. For instance, at 300, an exemplary user interaction for projection begins by instantiating the software functionality of the invention. This may happen at startup of the device, or as part of initiating a projection request. For a non limiting example, users can launch the invention via a menu location under a start menu or a top level or easy to reach UI, such as a sidebar. At 310, the user sets the machine into "Presentation" mode. Presentation mode can affect other tasks that are invoked by the operating system during a presentation, e.g., turn off notifications, turn off screen blanking, prevent audio from other sources, change power scheme, change desktop background, etc. In a non-limiting embodiment not illustrated in FIG. 3, if a top level or easy to reach UI is available and one or more displays are found, a display bar part appears. For this to occur, the machine may be in discovery mode for a predetermined amount of time, e.g., 30 seconds, after the Presentation mode has been selected in order to give the invention time to discover existing displays for projection. At 320, the user is asked via the UI if he wants to project content. If "Yes", the machine enters the discovery state at 330. If no, then the software exits or returns to step 300, or 310. At 340, a dialog box with a list of displays, e.g., projectors, appears. In one embodiment, with respect to other's laptops, the presenter does not receive a list of laptop displays, but rather the presenter creates a virtual meeting with meeting name/password for others to use in order to join. At 350, the user picks a display, e.g., projector to which to display content. In one embodiment, with respect to other's laptops, as above, the user does not select other's laptops, but rather creates a virtual meeting with meeting name/password for others to use. Discovery could also potentially happen in the background without any user intervention.

Although the discovery process may return all projectors and laptops, some may not be available for display, i.e., currently in use by another projection. In accordance with the invention, these include an indication that they are in use, e.g., these are grayed out in the display with a "busy" icon. As part of this dialog box, the user has the option to select from the Most Recently Used (MRU) projector list or to enter the name of the projector directly, which may include specifying a URL or IP address, without the need to discover the projector. The user is also presented with the option to configure the projection.

Once the an alternate display, e.g., projector, has been selected, projection may begin. If available, a UI element, e.g., portion of the top level or easy to reach UI, such as a sidebar, allows the user to: disconnect and/or add more people to the projection. For instance, in one embodiment, a flyout portion of the top level or easy to reach UI, such as a sidebar, allows a user to see who is in the presentation, and to potentially disconnect them, but not to add more. In this embodiment, if a user wants to be added, the user selects a presentation via the meeting name/password to join. A dialog box, e.g., display sidebar, thus shows status of projection, ability to disconnect and add more people to the projection list.

Figure 4A:
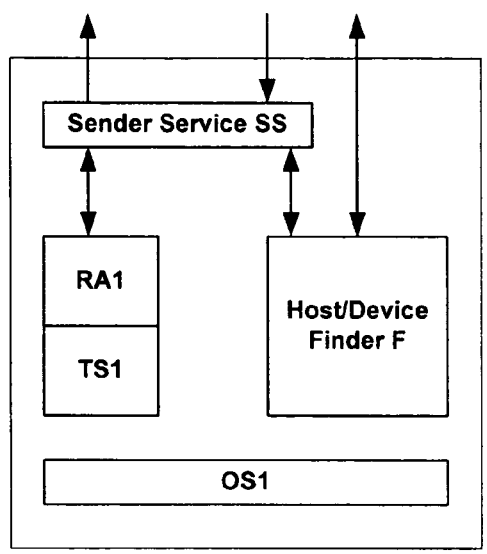
FIGS. 4A and 4B illustrate an exemplary architecture utilized in connection with the present invention.
Figure 4B:
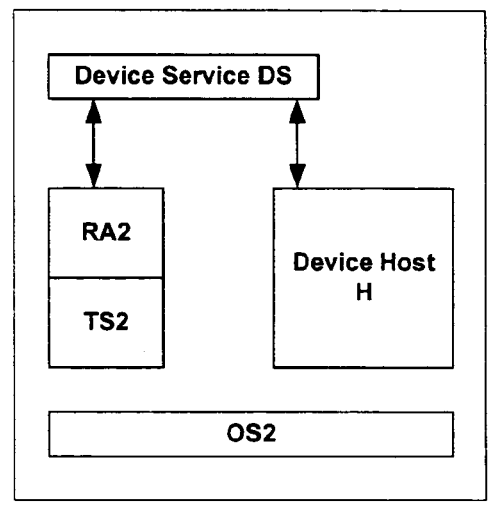

The architecture of the invention is illustrated in FIGS. 4A and 4B. Conference room projector technology in accordance with the invention combines two key technologies: UPnP and Terminal Services. The use of these two technologies in accordance with the invention allow a user to discover and remotely control a projector, project an application (Desktop, PowerPoint, etc.) and extend a desktop to a disaggregated display device. FIGS. 4A and 4B show the overall architecture of the meeting room multimon (MRM) service in accordance with the invention. At the lowest level is the operating system on which the Universal Plug and Play component UPnP and Terminal Services TS1 and TS2 and remote assistance RA1 and RA2 components are built. MRM utilizes both technologies in order to solve the problems addressed by the invention. Universal Plug and Play is used to discover and control the projector device. Terminal Services and remote assistance are used for the display rendering.

FIGS. 4A and 4B also show how the invention includes two parts: one part is used for control (MRM Sender), while the other is actually used to display the Sender's screen.

The Sender (FIG. 4A) provides the functionality via a service SS that controls and discovers the device. It does so using the mechanisms defined by Universal Plug and Play. In addition, the Sender includes the Terminal Services server TS1. Via this server, the Sender's screen information is distributed to the Terminal Services Client TS2, i.e., the alternate display device.

The control point of FIG. 4A discovers, controls, and projects to the Conference Room Projector Device of FIG. 4B, which may include laptops, projectors, monitors, etc. A Conference Room Projector Device utilizes Universal Plug and Play to advertise itself on the network. It uses the Terminal Services Client TS2 to "Connect" to the Terminal Services Server TS1 in the Control Point of FIG. 4A. It then receives the information describing the screen from the Terminal Services Server TS1.

Figure 5:
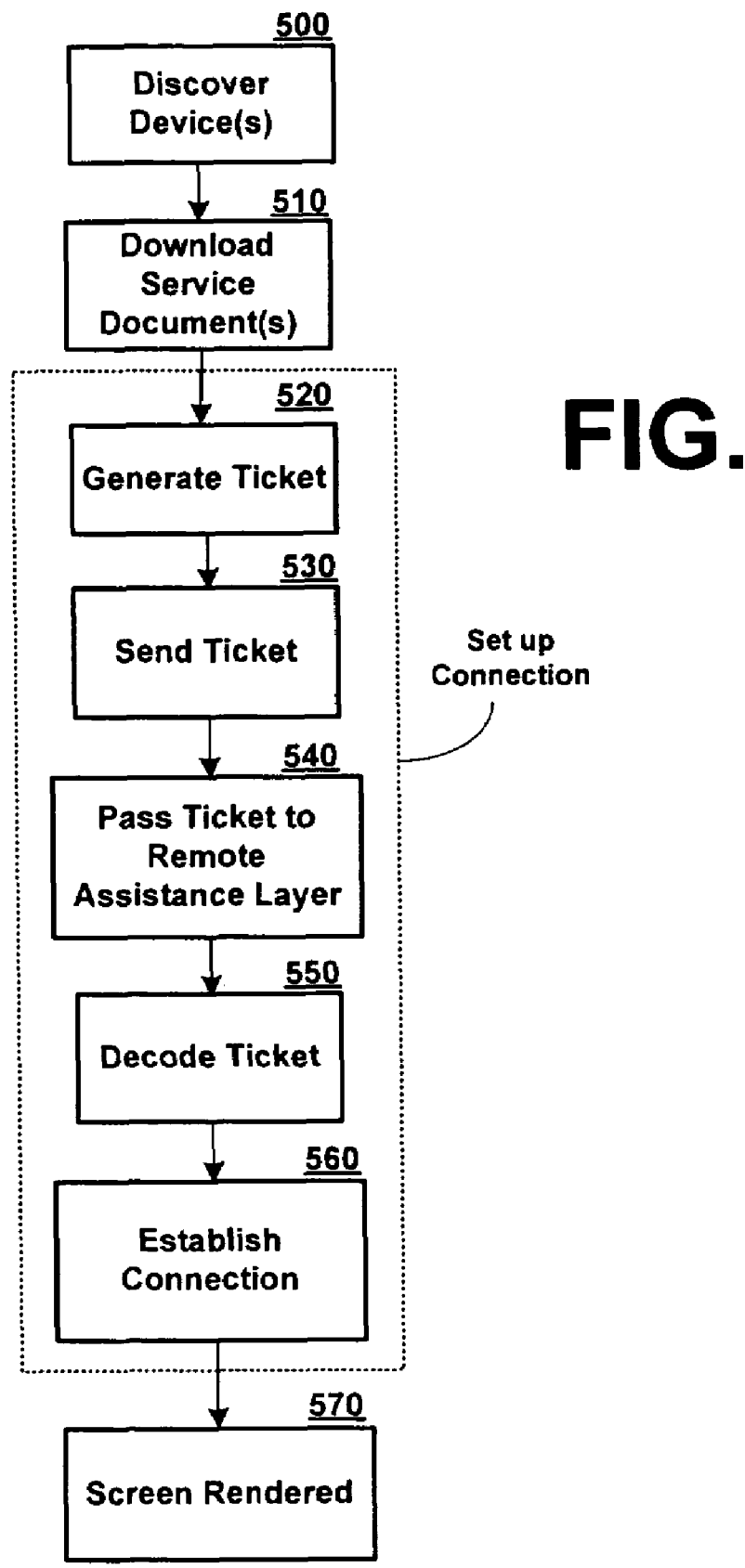
FIG. 5 illustrates an exemplary flow diagram relating to the process for connecting to an alternate display device.

FIG. 5 illustrates an exemplary flow diagram relating to the process for connecting to an alternate display device. At 500, the Control Point (or MRM) discovers alternate display device(s). This can be achieved by: 1) issuing a Universal Plug and Play search for that particular device, in which case all devices of this type respond to the request, or 2) listen for a device to advertise itself. Once the control point knows about the particular device, it then downloads the device's service document at 510.

Next, the sender and the device set up a connection between each other. At 520, a "ticket" is generated for the terminal services client by calling the appropriate APIs in the Remote Assistance Layer. This ticket gives information on how to connect to the Sender, and the mode to connect in (projection, extended desktop, show a specific application, etc). Next, at 530, the device's UPnP ProjectorService DS is called with the ticket. In other words, the Sender sends the ticket to the device. The device then passes the ticket to the Remote Assistance Layer on OS2 or other Receivers at 540. The ticket is decoded and handed to the Terminal Services client TS2 at 550. At 560, the Terminal Services Client TS2 connects to the server TS1 and establishes the connection. At 570, the Sender's screen data is rendered on the device via RDP.

FIG. 6 illustrates an exemplary flow diagram relating to the process for controlling an alternate display device. Once a user connects to the alternate display device at 600, the alternate display device returns a "SessionToken" that identifies the connection of the individual at 610. At a given point in time, one individual "owns" the alternate display device. In other words, initially there is only one individual telling the alternate display device what connection to project. In addition, this token is used for controlling the alternate display device. With this token, a user can: disconnect at 620, change/retrieve the display settings for their session at 630, transfer ownership at 640 and/or "blackout" their connection 650.

For a 1:1 projection, the projector control point utilizes an API, such as the SALEM layer API, to generate the tickets for establishing a connection. For a 1:N projection and other extended monitor projection, in one embodiment, the projector utilizes a communication and collaboration API from the terminal services layer, allowing multiple clients to participate in a multi-shadowing session. The API also provides a way to invite and un-invite clients into the shadowing session. The purpose of the user control point is to display a list of available alternate display device from which the user can select for connection.

As described above, the invention provides the ability to discover a conference room projector in a wireless setting, the ability to project a laptop display on a projector (mirror 1:1), the ability to project a laptop display on projector and/or to meeting attendees (1:m), even in the absence of a WinCE based projector and the ability to have speaker notes on the laptop as well as slide show on the projector (extended multimon). As mentioned, the invention also provides User Interface(s) for ease of user interaction for projection and aspects of the user interface mechanism(s) are now described in more detail.

In accordance with the invention, the user has the option to configure the projection. A configuration UI can be launched from the "Options" button on a dialog box in accordance with the invention that allows the user to any of: set a password for the projection, select cloning mode vs. extended mode, select the screen resolution and select video, or audio and video. In one embodiment, the system defaults to cloning mode, the screen resolution defaults to current system settings and "audio and video" is selected by default.

In one aspect, the user interface of the invention enables a user to indicate whether he wants to "project" or "allow others to project" to his laptop. If the user selects "allow others to project", the machine enters "available for discovery" state, i.e., the machine begins to broadcast its availability, so that a host that is looking for available alternate display devices receives an indication that the machine is available. Alternatively, if a user receives a notification from someone wanting to present to his/her laptop, the user is asked to accept. If "yes" is selected, and the projection is password protected, then the user is asked to enter the password.

Once the projection has started, a client projection window appears which shows the projection. In one embodiment, the window includes two input elements (e.g., buttons)—one to disconnect, and the other for configuration. Configuration allows the user to turn off audio or let other people find the display, enabling the sender to discover other possible receivers for the content. With the disconnect button, the current projection session is ended and the projection window is dismissed. In one non-limiting embodiment, the presenter is not notified of which users are viewing the projection. In another non-limiting embodiment, the pointer becomes a laser red dot during projection to allow the presenter an easy way to highlight an item on the projection.

Figure 7A:
FIGS. 7A-7H illustrate exemplary non-limiting screenshots of various user interface scenarios in accordance with the invention.
Figure 7B:
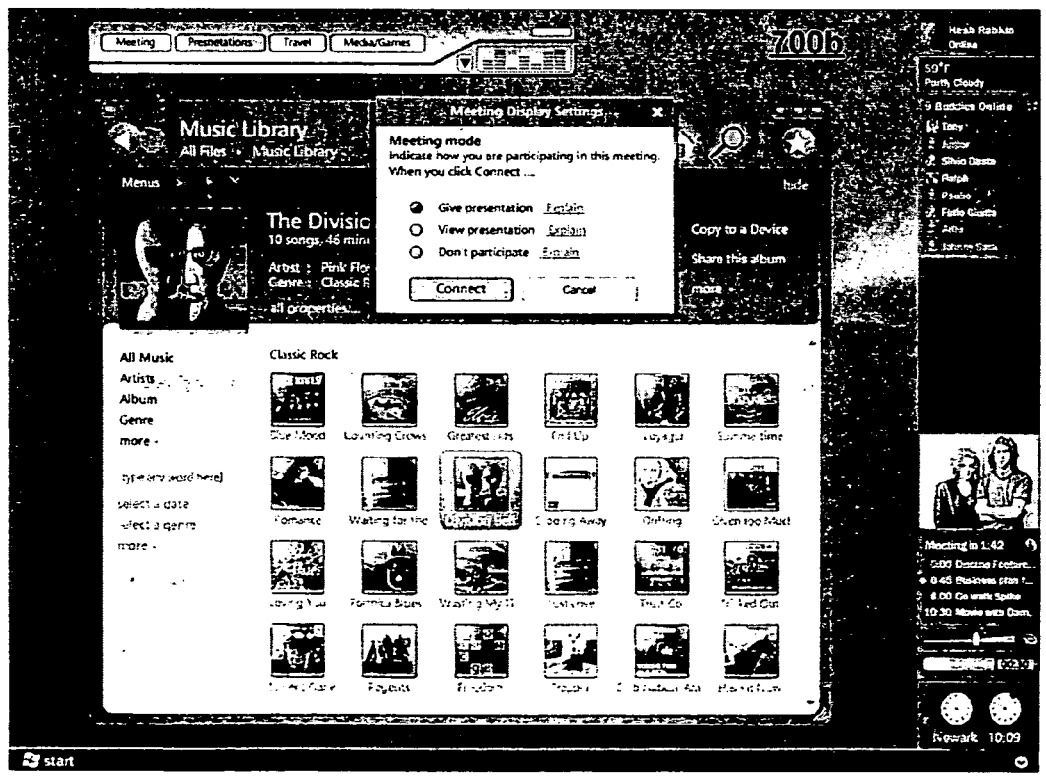
Figure 7C:
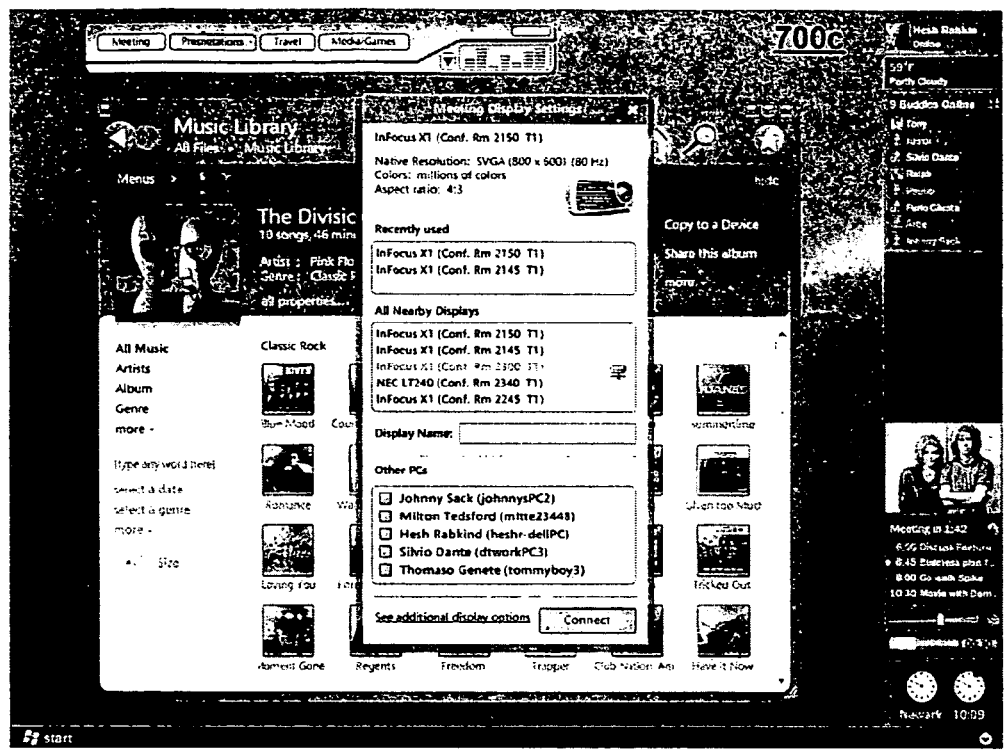
Figure 7D:
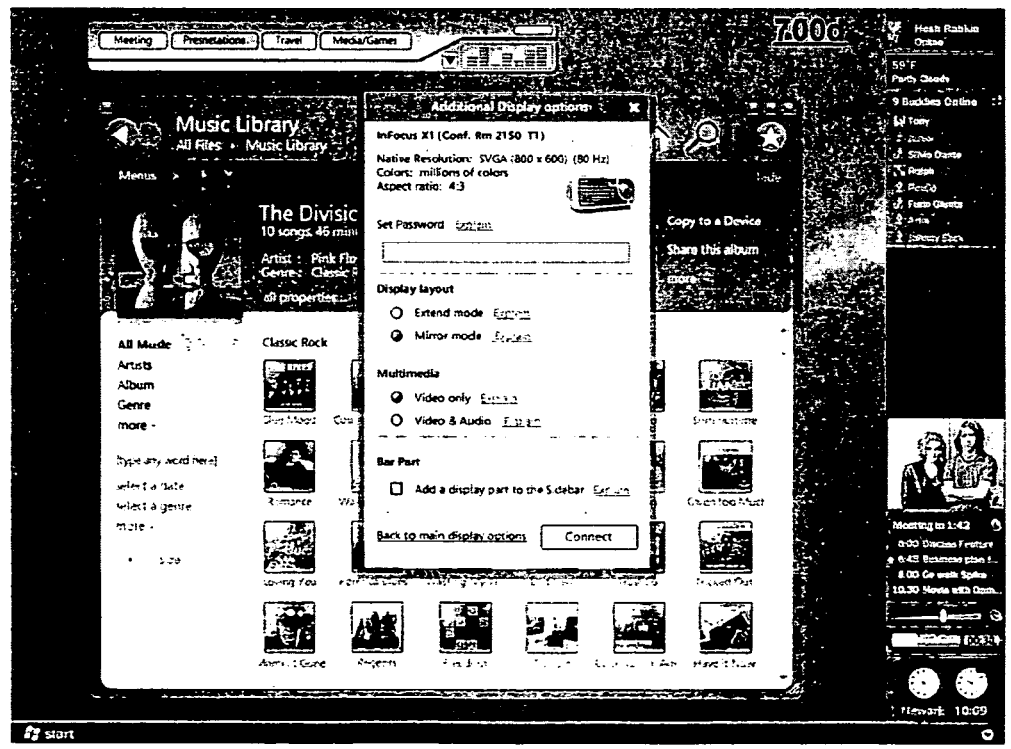
Figure 7E:
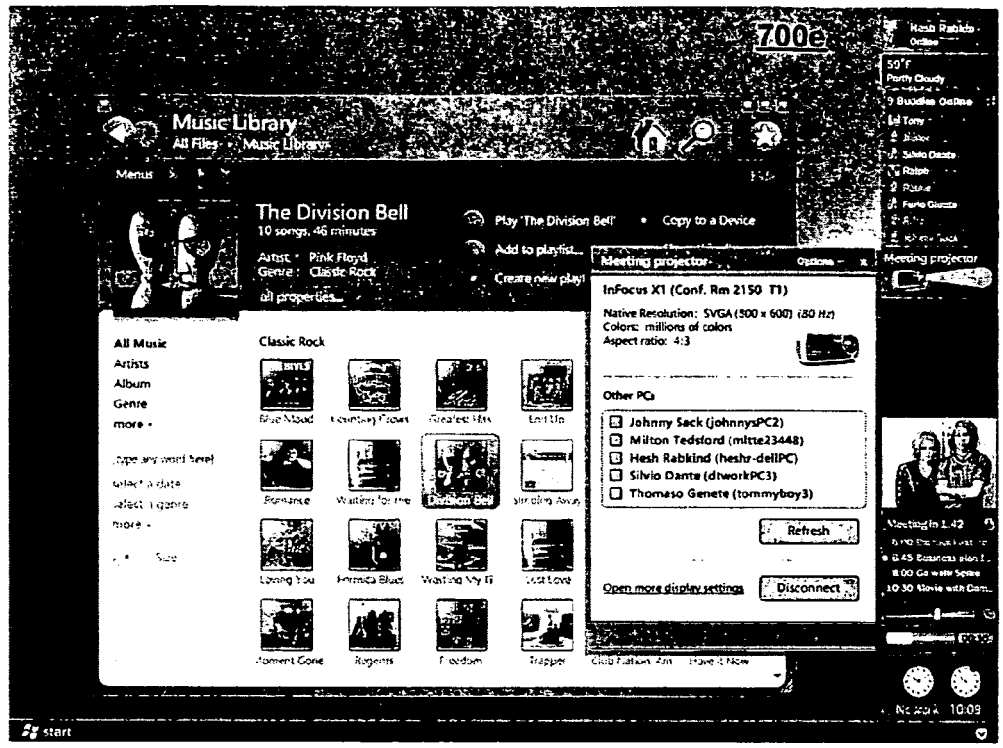
Figure 7F:
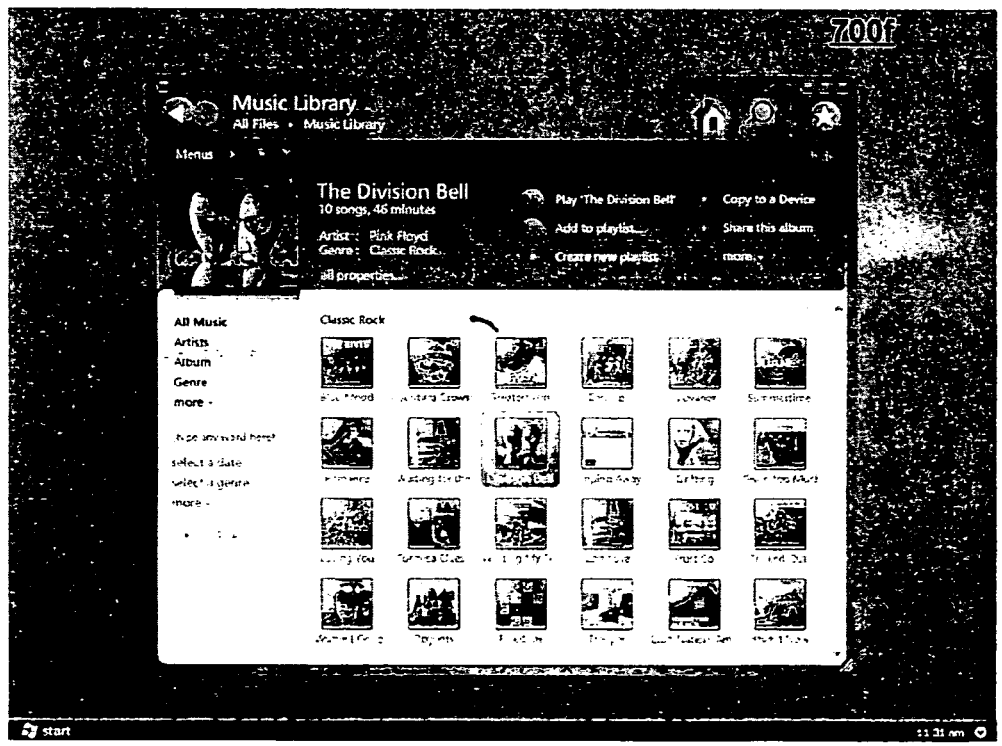
Figure 7G:
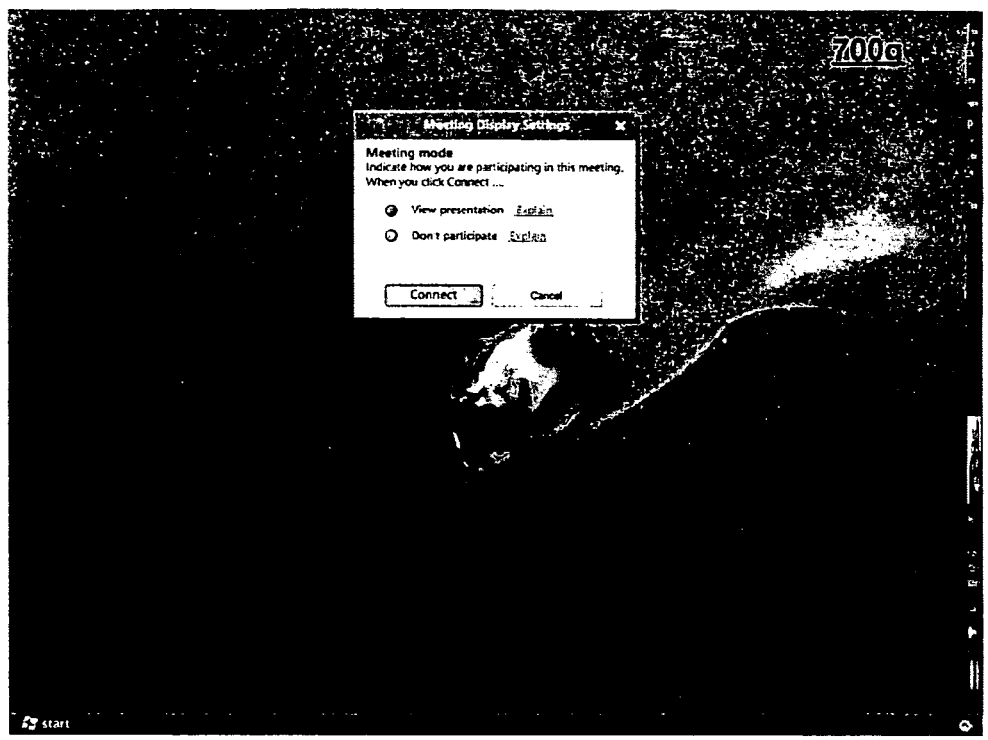
Figure 7H:
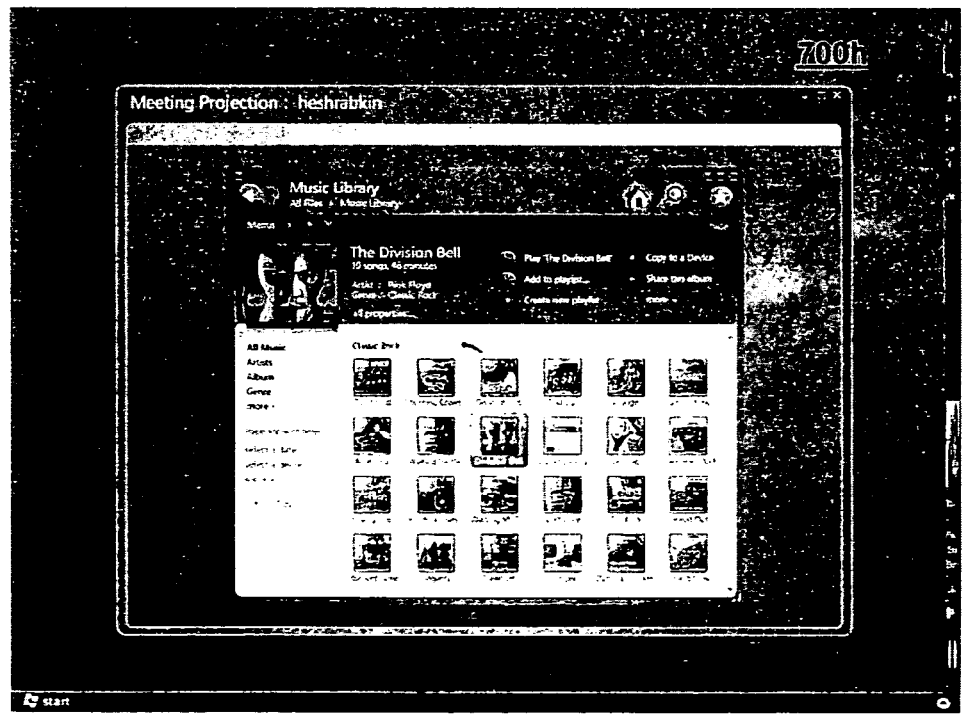

FIGS. 7A-7H illustrate exemplary non-limiting screenshots of various user interface scenarios in accordance with the invention. FIG. 7A illustrates an exemplary screen 700a to be projected to an alternate display device in accordance with the invention. FIG. 7B illustrates an exemplary screenshot 700b wherein a user is asked about participating in a meeting, as either a sender or a receiver. FIG. 7C illustrates an exemplary screenshot 700c wherein a user selects alternate display devices from a list. FIG. 7D illustrates an exemplary screenshot 700d wherein a user is presented with additional display options. FIG. 7E illustrates an exemplary screenshot 700e illustrating a projector bar part flyout scenario if a top level or easy to reach UI, such as a sidebar, is available. FIG. 7F illustrates an exemplary screenshot 700f showing the projection view on the alternate display device, wherein the pointer device has become a laser light dot. FIG. 7G illustrates an exemplary screenshot 700g wherein a meeting attendee is asked by the presenter to participate. FIG. 7H illustrates an exemplary screenshot 700h wherein the user accepts and begins receiving a projection window for rendering the content of the projection.

When the service is configured to allow the user to project to a display, the service can be used to find registered UPnP projector devices, query their current state, create a TS ticket to establish a connection and disconnect from a session.

MRM does not need to interface with TS. In one embodiment, establishing the connection is achieved through a UPnP API. Disconnecting and controlling the remote display utilizes the session token that is returned from the connect call. Simply obtaining status information does not require the use of any session data on the projector. (e.g. Projector status, resolution, etc.)

Additionally, exposed UIs render to display under current device settings (e.g., DPI, Resolution). As a result, size remains consistent across machines with different DPI and resolutions. UI is presented in a manner such that the user does not have to deal with any windows management issues in landscape and portrait orientations. Thus, in various embodiments, the projected screen fits to the aspect ratio of the device.

The following is an exemplary non-limiting subset of methods utilized to support projection scenarios in accordance with an embodiment of the invention.

(1) Connect ([in] BSTR bstrTicket, [in] BSTR bstrUser, [out, retval] BSTR *pbstrSession)

This method passes a Terminal Services ticket and the user's name to an application, which will attempt to establish a connection back to the originating machine. It returns a session string that can be used to control the device. In one embodiment, if no one was using the device, the initial state will transition from 0 (Available), to 1 (Connecting) to 3 (InUse) as the connection is established. If the device was in use, it may not be immediately controlled by the user. In order to disconnect from the session, the Disconnect method is called with the session string returned from this method.

(2) Disconnect ([in] BSTR bstrSession)

This method disconnects a session indicated by the string parameter. This value is the same as the string returned from the Connect method. In one embodiment, the state will transition from 3 (InUse) to 2 (Disconnecting) and 0 (Available) as the connection is brought down and the device reverts to its default settings.

Events for the following variables are raised after the internal values have been updated: A_CurrentUser, A_NextUser, A_UserCount and A_UserList. It is noted that TS-network-protocol has a feature called auto-reconnect which allows the connection to be re-connected in the event of a network loss.

(3) SetDisplayMode ([in] BSTR bstrSession, [in] long DisplayMode)

This method changes the display mode if the session parameter matches that of the user that is currently in control of the device.

(4) SetResolution ([in] BSTR bstrSession, [in] long width, [in] long height, [in] long colorDepth)

This method sets the resolution for the session.

(5) GetUserName ([in] long position, [out] BSTR*pbstrUser)

This method retrieves the name of a user.

In one embodiment, with respect to properties, the following non-limiting functions are implemented:

(1) get_A_State([out, retval] long *pState)

This retrieves the current state of the device and in one embodiment, the valid values are:
DISPLAYSTATE_AVAILABLE=0,
DISPLAYSTATE_CONNECTING=1,
DISPLAYSTATE_DISCONNECTING=2,
DISPLAYSTATE_INUSE=3,
DISPLAYSTATE_INITIALIZING=4.

The default value is 0. Any value other than 0 indicates the device is busy and no attempt is made to connect.

(2) get_A_DisplayMode([out, retval] long*pDisplayMode)

This retrieves the current display mode for the device.

(3) get_A_CurrentUser([out, retval] BSTR*pbstrUser)

This retrieves the current name of the current user who is in control.

(4) get_A_MaxUsers([out, retval] long*pcUsers)

This retrieves the maximum number of users the device can handle.

(5) get_A_Width([out, retval] long*pWidth)

This retrieves the current horizontal resolution. In one embodiment, the value can range from 800 to a variable MAXINT, which has a default value of 1024. SetResolution can be used to change this value.

(6) get_A_Height([out, retval] long*pHeight)

This retrieves the current vertical resolution. In one embodiment, the value can range from 600 to MAXINT, which has a default value of 768. SetResolution can be used to change this value.

(7) get_A_ColorDepth([out, retval] long*pColorDepth)

This is the number of bits per pixel for the color. In one embodiment, this value can be one of: 8, 16, 24, 32. It has a default value of 32, and SetResolution can be used to change this value.

The invention may optionally be combined with a variety of existing accessibility infrastructures and user interfaces. For instance, if Robert has mobility impairment and does not have motor control below the neck, Robert probably uses an on-screen keyboard with an electronic pointing device to achieve his computing objectives, i.e., he is able to use the keyboard shortcuts, larger fonts to select projector displays. In one embodiment of the invention, therefore, the output of a projection can be read via a screen reader. Thus, Robert is provided with keyboard access to all features, especially mouse-intensive actions, e.g., selecting projectors and laptop displays according to the invention. Keyboard accelerators (e.g., key shortcuts) are also provided to menu items and controls. In one embodiment, logical keyboard navigation order is used in dialog boxes and for similar groups of objects. In this sense, "logical" normally equals left to right, and top to bottom, which can change for international users depending upon the language/culture.

In one embodiment, color alone is not used to differentiate between items, ensuring that all information conveyed with color is also available without color. With respect to system settings, in various embodiments, the invention supports control panel settings for colors where possible, otherwise allowing users to customize the color. Images are drawn using standard foreground and background colors. Also, when the high contrast flag is set via the Accessibility Control Panel, bitmapped images or other complex backgrounds behind text and controls are omitted, images are drawn in monochrome instead of multiple colors, and application-specific colors are replaced with standard system colors defined through Control Panel, with the fewest possible color combinations used. Objects are drawn using the sizes (i.e., screen metrics) selected in Control Panel. Also, if lines are drawn, the proper width is determined rather than using a fixed value. Moreover, in various embodiments, any custom controls include active accessibility properties.

Distance and obstructions can degrade wireless performance. Thus, in various embodiments of the invention, an icon is displayed via the UI mechanism(s) of the invention that indicates the signal quality. A predetermined number of levels of signal quality can be shown corresponding to obstructions, distance and data rate to be maintained.

The invention may also be combined with international language and multilingual user interface (MUI) techniques such that the content, when delivered to a device owned by a foreign user, optionally will be displayed according to the language of the foreign user.

The projection of the invention, based on the presence on IP network, can be either wired or wireless. For instance, in a wired case, Joseph is in his office (wired) and wants to project a slide deck to a guest in his office, who has a laptop (connected either wired or wirelessly). It is noted that the invention applies to any computing device, PC or otherwise, not just mobile devices.

In various embodiments, 1:1 projection includes discovery, connection to the alternate display device and transmission of data. Discovery can be user initiated or can be automatic in the background while the user is doing some task, or the system is idle, etc. 1:1 projection can be either extended or mirrored. In the extended case, there is a UI to enable one to navigate the presentation on the alternate display. For instance, one may have a PowerPoint presentation being presented on a projector and one wants to go to the next slide while having speaker notes on the laptop screen. In this case, one can use a UI on the laptop screen to highlight something on the slide or go to the next slide. Accordingly, the invention contemplates the scenario where there may be some portion of the sender's display (e.g., notes) that the sender does not wish to be seen on the rendering side, and also contemplates the scenario where there may be some portion of the sender's display not part of the rendering side as part of the ordinary projection of data, but which is added to the projection so that it is apparent on the rendering side.

In various embodiments, 1:n projection includes notification to the network of an ongoing presentation. Rules can also be associated with the presentation, which are modifiable/expandable. Examples of rules include: (A) People who can join/view the presentation, (B) Password or any other authentication of the presentation, (C) Annotation of the presentation on the viewer side and/or recordation/storage of the annotations and (D) Enforcement of Content Rights Management rules, e.g., the ability to enforce not taking a Print Screen of the slide.

Projection also includes the ability to broadcast the presence of a presentation on the network, but not to the people who are actually on the network. Non UPnP based discovery can also be achieved in alternate embodiments. While discovery can be achieved via IP as described above, discovery can be achieved by means of any protocol, i.e., a machine can be pinged directly to see if a presentation is occurring.

As part of the user experience, in one embodiment, users can enter a "View Presentation" mode and see a list of presentations going on throughout the network. A receiver could also receive notifications relating to a presentation, e.g., a notification that a presentation is nearby or that someone specifically wishes to present to you.

The invention also includes the ability to transfer control of a presentation to another connected user, whereby any user can transfer control of the presentation to another person. As alluded to above, there can be administrative rights assigned by the person who owns the presentation as to who can receive control of the presentation, and what level of control, etc. The user experience that exposes the list of people currently viewing the presentation includes the ability to add or remove someone, if authorized. The invention also contemplates the ability to attend multiple presentations simultaneously with varying degrees of control, i.e., rules can be assigned per presentation.

The invention also includes the ability to combine 1:1 and 1:n projection scenarios, where possible. Since alternate display devices, such as a projector, can have a queue of devices wanting to use the alternate display device for their respective presentations, the invention includes a mechanism to manage the queuing of presentations by devices. Ability for any application to start a mode in the presentation i.e. view or start a new presentation.

As mentioned, the invention includes the ability to configure what is actually presented, i.e., audio and video, audio only, or video only. In one embodiment, the invention also includes "Laser Pointer" functionality, i.e., a user can temporarily highlight something in an ongoing presentation during the presentation via an auxiliary input mechanism corresponding to an auxiliary display effect, such as "laser pointing." For instance, mouse movements may be converted to a mimic a laser pointer with trail.

In further embodiments, the invention provides systems and methods for controlling remote presentation of content with public and private aspects. In this regard, the invention distinguishes between public content of a presentation that is meant to be sent (i.e., remoted, broadcast or otherwise transmitted) to client devices (other laptops, projector, etc.) for display, and private content of a presentation that is meant to preserve its functionality, e.g., be displayed, on the server computing device from which the public content is being remoted. In one embodiment of the user interface of the invention, by default, content generated or altered previous to or concurrent with a publishing act, such as "printing" to the journal in the TabletPC context, is public content, and alterations (e.g., annotations, highlighting, other additions, masking of public content, deletions, etc.) to the content made after the publishing act form the basis for private content. In another embodiment of the user interface of the invention, a user can take some action with respect to content, and designate some or all of the resulting content added, masked or removed by the action to be private. Consequently, during a content remoting experience, client devices display only the public content, while the private content remains for display at the server device.

Advantageously, the presentation including the private content at the server device remains synchronized with the display of the client devices, e.g., when a slideshow is being rendered, a change of slide at the server device correspondingly changes the slide at the client devices. Also of advantage, the presenter is able to control the display of the static public content sent to the client device(s) via the user interface mechanism of the invention, while retaining the ability to view the private content on the server computing device (e.g., by inputting page up/page down or other similar commands for a PowerPoint slideshow).

In this regard, when presenting content using software, such as PowerPoint, Journal, Excel, Word, XML, HTML, etc., the presenter typically has his or her back to the screen. For example, it can be cumbersome to ensure that the audience is looking at the same material the presenter is speaking about, requiring the speaker to ask another person to advance the public slide deck, or, if the speaker is advancing the deck, the speaker must occasionally glance back at the screen to ensure the deck is in the right spot, which can disrupt the flow of the presentation. The invention thus remotely advances the public presentation of the deck as the speaker advances his/her private presentation on the computer. Accordingly, the invention advantageously enables the speaker to annotate a copy of the deck using the capabilities of the computer, but when displayed to the public, only the "public" portions of the deck are displayed—private annotations are hidden from public view. For example, the speaker can annotate each presentation slide with ink indicating points he or she wants to emphasize or with additional talking points. When that slide deck is then displayed (under control of the speaker's computing device), the remote control aspect of the invention ensures that public is looking at the same slide as shown on the speaker's PC while the public-private aspect of the invention hides the private annotations/alterations so that only the public portions of the deck are displayed.

Figure 8B:
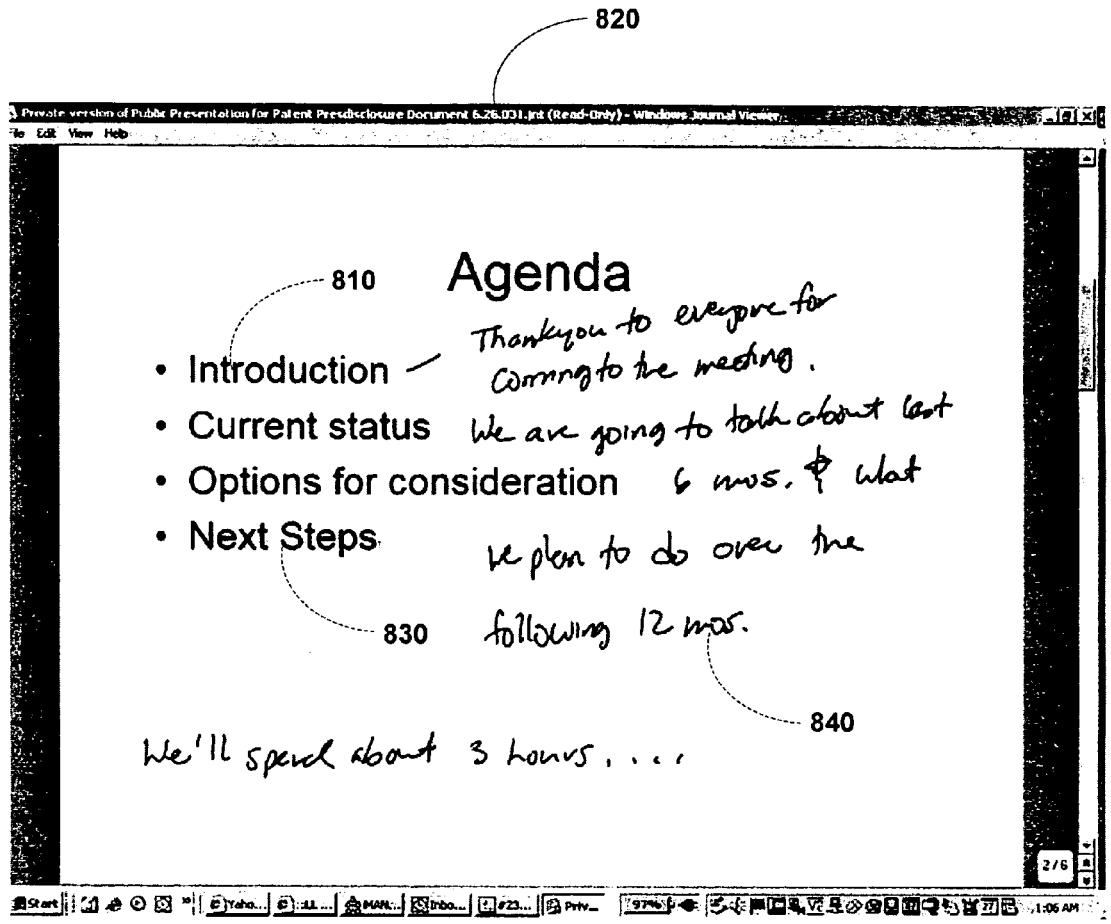

An exemplary slide 800 of a slideshow is illustrated in FIG. 8A. Exemplary public content 810 of the slideshow includes an "Agenda" heading and various talking points including "Introduction," "Current Status," "Options for Consideration" and "Next Steps." As with other embodiments described herein, the presently described embodiments also enable the extension of content 810 from a computing device in the context of a presentation to a group of people, whether they are in the same room or remotely dispersed. In one embodiment, a stylus type computing device, such as the TabletPC, is considered. For instance, stylus type computing devices are great tools for annotating documents, such as a slideshow presentation. Thus, as illustrated in FIG. 8B, slide 800 including public content 810 may be annotated with speaker notes, drawings, video, photos, text or the like. As a non-limiting example, annotations 840 give cues to the speaker delivering the slideshow of things to address during delivery of the slide 800. For another non-limiting example, part of the slide 800 may be highlighted with highlighting 830. In each of these cases, the speaker may wish only to remote the public content 810. Accordingly, in accordance with the invention, in conjunction with performing an action, such as annotating or highlighting, that alters the content, an author may designate the results of the action to be private content such that the private content will only be (optionally) displayed on the server device from which the public content 810 is being remoted to client devices. As mentioned above, default behavior may also specify which content is public and which content is private. For instance, once the content of a TabletPC is published to the Journal, the content comprises the public content whereas, by default, subsequent alterations to the content may be considered private. Thus, when the content (public and private) of FIG. 8B is remoted to client devices, e.g., other laptops, projectors, etc., the client devices receive the view illustrated in FIG. 8A.

In another similar scenario illustrated in FIG. 8C, an author may want to remove or mask detail from the public content 810, e.g., to abstract away from the detail of the presentation. For instance, public content 810 may include video, a photo or the like that the speaker would find distracting during delivery of the presentation. Accordingly, as illustrated in FIG. 8C, an author may delete, or otherwise screen or mask, some of public content 810, and designate the erasure/masking 850 as private, so that when the content (public and private) of FIG. 8C is remoted to client devices, the client devices receive the view illustrated in FIG. 8A, whereas the server device will display the view of FIG. 8C. Optionally, the presenter may turn the private/public distinction off, whereby client devices will also receive the private content. Also, the presenter may also choose to view only the public content (or only the private content).

Thus, the invention can be implemented in the context of a document to be transmitted to alternate display devices, wherein the document can be considered to be two versions, i.e., a first version of the document that is public and a second version (different in some manner than the first version) that includes private content, wherein the private content is represented by the delta between the first and second versions (either additions or deletions). As mentioned, while the invention is not limited thereto, stylus computing devices, such as TabletPC provide an exemplary environment for implementation of the invention. For instance, TabletPC includes the ability to import files into a Journal (first version) whereby thereafter, the tablet pen can be used to annotate or otherwise alter the document images (second version). Files are imported into the Journal by "printing" them to the Journal. Reports, forms, presentations, spreadsheets, graphics, photos, Web pages, etc. can all be imported into the Journal. In this regard, if the document can be printed, it can be imported into the Journal and annotated without changing any of the original content of the imported file. For instance, if one is en route to a meeting, one can import the meeting agenda, (e.g., a portable document format (pdf) file, word processing document, spreadsheet, slideshow file, email file, etc.) into Journal. Then, using the tablet pen, notes can be taken on the agenda of items being addressed. One's impressions of the document can thus be simply recorded and viewed. For example, one can project the content of the Tablet PC to the large-screen monitor in the conference room, import an image of the document into Journal and/or start putting comments on the document image.

The Journal writer is a virtual printer that manages the import of document images into Journal notes. Any program that lets you print can thus send the document to the Journal writer just as it would when printing to a physical printer. The Journal can then convert the document into a document image that is used as the background for a Journal note. In Journal, a document image can be created in at least three ways: by using the print command of a different program (useful if the file is open in another program), by using the Journal Import command (useful if you are working in Journal and want to import a file) and/or by using the drag-and-drop feature of search software such as Windows Explorer (useful for dragging a file directly into the Journal). Any file imported into Journal is imported into a new note as a set of background images. The contents of these background images cannot be changed in Journal, and accordingly, these background images are suited to being the public content of the presentation sent to alternate display devices in accordance with the invention.

There are multiple ways of implementing the present invention, e.g., an appropriate API, tool kit, driver code, operating system, control, standalone or downloadable software object, etc. which enables applications and services to use the wireless projection systems and methods of the invention. The invention contemplates the use of the invention from the standpoint of an API (or other software object), as well as from a software or hardware object that receives content and/or makes requests according to device discovery and content acceptance and delivery protocols in accordance with the invention. Thus, various implementations of the invention described herein may have aspects that are wholly in hardware, partly in hardware and partly in software, as well as in software.

As mentioned above, while exemplary embodiments of the present invention have been described in connection with various computing devices and network architectures, the underlying concepts may be applied to any computing device or system in which it is desirable to project content to another device or receive projected content from another device. For instance, the algorithm(s) and hardware implementations of the invention may be applied to the operating system of a computing device, provided as a separate object on the device, as part of another object, as a reusable control, as a downloadable object from a server, as a "middle man" between a device or object and the network, as a distributed object, as hardware, in memory, a combination of any of the foregoing, etc. While exemplary programming languages, names and examples are chosen herein as representative of various choices, these languages, names and examples are not intended to be limiting. One of ordinary skill in the art will appreciate that there are numerous ways of providing object code and nomenclature that achieves the same, similar or equivalent functionality achieved by the various embodiments of the invention.

As mentioned, the various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device generally includes a processor, a storage medium readable by the processor (including volatile and non-volatile memory and/or storage elements), at least one input device, and at least one output device. One or more programs that may implement or utilize the wireless content projection techniques of the present invention, e.g., through the use of a data processing API, reusable controls, or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

The methods and apparatus of the present invention may also be practiced via communications embodied in the form of program code that is transmitted over some transmission medium, such as over electrical wiring or cabling, through fiber optics, or via any other form of transmission, wherein, when the program code is received and loaded into and executed by a machine, such as an EPROM, a gate array, a programmable logic device (PLD), a client computer, etc., the machine becomes an apparatus for practicing the invention. When implemented on a general-purpose processor, the program code combines with the processor to provide a unique apparatus that operates to invoke the functionality of the present invention. Additionally, any storage techniques used in connection with the present invention may invariably be a combination of hardware and software.

While the present invention has been described in connection with the preferred embodiments of the various figures, it is to be understood that other similar embodiments may be used or modifications and additions may be made to the described embodiment for performing the same function of the present invention without deviating therefrom. For example, while exemplary network environments of the invention are described in the context of a networked environment, such as a peer to peer networked environment, one skilled in the art will recognize that the present invention is not limited thereto, and that the methods, as described in the present application may apply to any computing device or environment, such as a gaming console, handheld computer, portable computer, etc., whether wired or wireless, and may be applied to any number of such computing devices connected via a communications network, and interacting across the network. Furthermore, it should be emphasized that a variety of computer platforms, including handheld device operating systems and other application specific operating systems are contemplated, especially as the number of wireless networked devices continues to proliferate.

While exemplary embodiments refer to utilizing the present invention in the context of laptops and projectors, the invention is not so limited, but rather may be implemented to provide wireless delivery of content from any one computing device including the functionality of the invention to one or more other computing devices also including functionality according to the invention. Moreover, the source computing device need not even independently have a display. For instance, with a mobile storage device with minimal processing resources, content may be delivered from the mobile storage device to an alternate display device according to the invention without independent display capabilities. Still further, the present invention may be implemented in or across a plurality of processing chips or devices, and storage may similarly be effected across a plurality of devices. Therefore, the present invention should not be limited to any single embodiment, but rather should be construed in breadth and scope in accordance with the appended claims.

What is claimed is:

1. A method for projecting content from a sender device to an alternate display device, the method comprising:
   discovering in the sender device, at least one of a plurality of alternate display devices by using a meeting room multimon (MRM) service comprising one of (A) a wireless Universal Plug and Play (UPnP) search or (B) listening for a wireless advertisement emitted by the at least one of the plurality of alternate display devices;
   establishing a remote session, via a remoting protocol, between the sender device and the at least one alternate display device, the establishing comprising:
      receiving in the sender device, a service document of the at least one alternate display device;
      generating in the sender device, a ticket that provides information on a) how to connect to the sender device and b) which one amongst a plurality of projection modes is to be used; and
      sending the ticket from the sender device to the at least one alternate display device; and
   transmitting from the sender device to the at least one alternate display device, said content that is rendered thereon, on the at least one alternate display device.

2. A method according to claim 1, wherein the remoting protocol is the remote desktop protocol and the remote session is a terminal services (TS) session.

3. A method according to claim 1, further comprising authoring said content.

4. A method according to claim 3, further comprising publishing said content.

5. A method according to claim 4, wherein content authored before said publishing comprises private content and public content.

6. A method according to claim 3, wherein said authoring includes designating via a second user interface mechanism at least one portion of the content as private content.

7. A method according to claim 6, wherein said authoring includes designating at least one alteration of said public content as private content.

8. A method according to claim 7, wherein said authoring includes designating at least one of a masking, a deletion, an annotation and a highlighting of said content as private content.

9. A method according to claim 1, wherein the content is substantially simultaneously displayed on the at least one alternate display device in response to said transmitting.

10. A method according to claim 1, further comprising controlling the display of a public portion of the content, on said at least one alternate display device via a second user interface mechanism on said sender device.

11. A method according to claim 10, wherein said controlling includes controlling a rate of viewing of said content via at least one input device of said sender device.

12. A method according to claim 1, wherein said content is a slide presentation.

13. A method according to claim 1, further including, for each remote session between the sender device and the at least one alternate display device, displaying via a second user interface mechanism an indication of a signal strength associated with the remote session.

14. A method according to claim 1, wherein said transmitting includes transmitting only a public portion of said content, to the at least one alternate display device.

15. A computer readable storage medium comprising computer executable modules having computer executable instructions for carrying out the method of claim 1.

16. A computing device comprising means for performing the method of claim 1.

17. A computer readable storage medium comprising computer executable instructions for implementing a method of interfacing with a user of a computing device having content including at least one public portion and at least one private portion capable of being projected to other computing devices, the method comprising:
displaying a user interface on the computing device;
selecting via the user interface the content including the at least one public portion;
establishing a remote session, via a remoting protocol, between the computing device and at least one of the other computing devices, the establishing comprising:
generating in the computing device, a ticket that provides information on a) how to connect to the computing device and b) which one amongst a plurality of projection modes is to be used; and
sending the ticket from the computing device to the at least one of the other computing devices; and
via said user interface, transmitting at least said at least one public portion of the selected content to the other computing devices, whereby when said content is rendered on at least one of the other computing devices, only the at least one public portion is rendered.

18. A computer readable storage medium according to claim 17, further comprising generating a first content version including the at least one public portion and altering said first content version thereby forming a second content version, whereby the difference in display between said first and second content versions comprises said at least one private portion.

19. A computer readable storage medium according to claim 18, wherein said generating includes publishing said at least one public portion.

20. A computer readable storage medium according to claim 19, wherein said computing device is a stylus pen input device and said publishing includes printing said at least one public portion to a journal.

21. A computer readable storage medium according to claim 18, wherein said altering includes at least one of adding to, masking, highlighting, annotating and deleting from said first content version.

22. A computer readable storage medium according to claim 17, further comprising using a session token for controlling the at least one of the other computing devices.

23. A computer readable storage medium according to claim 17, further comprising placing said computing device in an "available for discovery" state.

24. A computer readable storage medium according to claim 17, further comprising displaying a client projection window which shows said at least one public portion.

25. A computer readable storage medium according to claim 17, further comprising rendering said at least one private portion and said at least one public portion on said computing device, whereby in response to said transmitting, the at least one public portion rendered on said at least one of the other computing devices is rendered substantially simultaneously with said at least one public portion and said at least one private portion rendered on said computing device.

26. A computer readable storage medium according to claim 17, further comprising controlling the rendering of the at least one public portion on said at least one of the other computing devices via said user interface.

27. A computer readable storage medium according to claim 26, wherein said controlling includes controlling a rate of viewing of said at least one public portion via at least one input device of said computing device.

28. A computer readable storage medium according to claim 26, wherein said controlling correspondingly controls rendering of said at least one public portion and said at least one private portion on said computing device.

29. A computer readable storage medium according to claim 17, wherein said transmitting comprises utilizing a communication and collaboration API for operating a multi-shadowing session whereby a 1:N projection is carried out upon N other computing devices.

30. A computer readable storage medium according to claim 17, wherein the other computing devices include at least one of (A) at least one projector device and (B) at least one available other notebook computer.

* * * * *